United States Patent
Meyer et al.

(10) Patent No.: US 12,553,927 B2
(45) Date of Patent: Feb. 17, 2026

(54) METHODS, SYSTEMS AND DEVICES FOR MONITORING POWER CONSUMPTION AND GENERATION

(71) Applicant: Powersensor Pty Ltd, Melbourne (AU)

(72) Inventors: Bernd Meyer, Melbourne (AU); Joe Losinno, Melbourne (AU)

(73) Assignee: Powersensor Pty Ltd, Melbourne (AU)

( * ) Notice: Subject to any disclaimer, the term of this patent is extended or adjusted under 35 U.S.C. 154(b) by 405 days.

(21) Appl. No.: 18/246,056

(22) PCT Filed: Sep. 22, 2021

(86) PCT No.: PCT/AU2021/051104
§ 371 (c)(1),
(2) Date: Mar. 21, 2023

(87) PCT Pub. No.: WO2022/061402
PCT Pub. Date: Mar. 31, 2022

(65) Prior Publication Data
US 2023/0358793 A1    Nov. 9, 2023

(30) Foreign Application Priority Data
Sep. 22, 2020 (AU) .............................. 2020903407

(51) Int. Cl.
*G01R 21/08* (2006.01)
*G01R 21/00* (2006.01)
(Continued)

(52) U.S. Cl.
CPC ........... *G01R 21/08* (2013.01); *G01R 21/133* (2013.01); *G01R 21/002* (2013.01); *G01R 22/10* (2013.01)

(58) Field of Classification Search
CPC .... G01R 21/002; G01R 21/08; G01R 21/133; G01R 22/10; G01R 15/20; G01R 15/207; G01R 35/02; G01R 35/04
(Continued)

(56) References Cited

U.S. PATENT DOCUMENTS

| | | | |
|---|---|---|---|
| 10,802,059 B2 * | 10/2020 | Losinno | .................. H02S 50/00 |
| 2012/0001617 A1 | 1/2012 | Reynolds | |
| 2018/0321350 A1 * | 11/2018 | Marshall | .............. G01R 35/005 |

FOREIGN PATENT DOCUMENTS

| WO | 2017152243 A1 | 9/2017 |
|---|---|---|
| WO | 2022061402 A1 | 3/2022 |

OTHER PUBLICATIONS

International Search Report for PCT/AU2021/051104 dated Oct. 26, 2021, 5 pages.
(Continued)

*Primary Examiner* — John H Le
(74) *Attorney, Agent, or Firm* — Kilpatrick Townsend & Stockton LLP

(57) ABSTRACT

Embodiments generally relate to a method for allowing power supplied through a cable to be determined. The method comprises receiving magnetic field data, the magnetic field data relating to a magnetic field generated by the cable, receiving reference data, the reference data relating to a current supplied to one or more monitored loads powered through the cable; based on the received magnetic field data and reference data, determining at least one parameter of a function that relates the magnetic field generated by the cable to the power supplied through a cable; and making available the at least one parameter, so that a power supplied by the cable can be determined based on the at least one parameter and a magnetic field value. The one or more monitored loads are a subset of all the loads powered through the cable.

18 Claims, 12 Drawing Sheets

(51) Int. Cl.
*G01R 21/133* (2006.01)
*G01R 22/10* (2006.01)

(58) Field of Classification Search
USPC .......................................................... 702/61
See application file for complete search history.

(56) References Cited

OTHER PUBLICATIONS

Invitation to Correct Defects in the International Application No. PCT/AU2021/051104 mailed Sep. 28, 2021, 2 pages.

* cited by examiner

METHODS, SYSTEMS AND DEVICES FOR MONITORING POWER CONSUMPTION AND GENERATION

CROSS REFERENCE TO RELATED APPLICATIONS

This application is a 371 National phase filing of PCT/AU2021/051104, filed Sep. 22, 2021, which application claims priority to Australian Patent Application No. 2020903407, filed Sep. 22, 2020, the contents of which are hereby incorporated by reference in their entireties for all purposes.

TECHNICAL FIELD

Described embodiments generally relate to power monitoring. In particular, described embodiments are directed to systems, methods and devices for measuring power consumption and generation.

BACKGROUND

Measuring power requires monitoring both voltage and current in a circuit. For measuring the power consumed or generated by one or more appliances, this typically requires making direct electrical contact with a household mains supply and inserting a power meter between the supply and the load or appliance. This is a relatively straightforward and effective way to measure power for low-power plug-in appliances, and known devices such as inline power meters can be used to measure power in this way by inserting these devices between the supply and the appliance in question. Such inline power meters can be installed by consumers without special training.

However, there are many situations in which this approach is impractical or inapplicable, and which currently cannot be addressed with a consumer-installable solution. For example, an electrician may be required to install the power meter for any hard-wired appliances, because the power meter must be installed in-line with the load circuit which may make the installation more complex for an existing hard-wired appliances. Measuring the power to hardwired appliances or the total power to a premise or household is typically done using current transformers (CTs), which also require professional installation due to the need to encircle a single current-carrying conductor.

While in-line power meters can be readily used to measure the power consumed by plug-in appliances, these only measure power for the single appliance and do not allow the total power consumed by a premises to be measured.

It is desired to address or ameliorate one or more shortcomings or disadvantages associated with prior power monitoring methods, systems and devices, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this document, a statement that an element may be "at least one of" a list of options is to be understood to mean that the element may be any one of the listed options, or may be any combination of two or more of the listed options.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a method for allowing power supplied through a cable to be determined, the method comprising:
 receiving magnetic field data, the magnetic field data relating to a magnetic field generated by the cable,
 receiving reference data, the reference data relating to a current supplied to one or more monitored loads powered through the cable;
 based on the received magnetic field data and reference data, determining at least one parameter of a function that relates the magnetic field generated by the cable to the power supplied through a cable; and
 making available the at least one parameter, so that a power supplied by the cable can be determined based on the at least one parameter and a magnetic field value;
 wherein the one or more monitored loads are a subset of all the loads powered through the cable.

Some embodiments relate to a method of determining power supplied through a cable, the method comprising:
 receiving magnetic field data, the magnetic field data relating to a magnetic field generated by the cable,
 receiving reference data, the reference data relating to a current supplied to one or more monitored loads powered through the cable;
 based on the received magnetic field data and reference data, determining at least one parameter of a function that relates the magnetic field generated by the cable to the power supplied though a cable; and
 based on the at least one parameter and a magnetic field value, determining a power supplied by the cable;
 wherein the one or more monitored loads are a subset of all the loads powered through the cable.

According to some embodiments, the at least one parameter is a proportionality factor.

In some embodiments, the proportionality factor is determined by:
 determining at least one time period over which the received reference data changes;
 selecting magnetic field data that corresponds to the at least one time period; and
 determining a proportionality factor by minimising an error measure across all determined time periods.

In some embodiments, minimising an error measure across all determined time periods comprises:
 determining an ideal proportionality factor value that relates the changes in received reference data to the changes in selected magnetic field data for each determined time period;
 determining a weight for each determined ideal proportionality factor value;
 choosing an overall proportionality factor, the overall proportionality factor being a value such that approximately half of the determined weights relate to ideal proportionality factors lower than the overall proportionality factor, and approximately half of the determined weights relate to ideal proportionality factors higher than the overall proportionality factor.

According to some embodiments, the received reference data corresponds to the same time as the received magnetic field data.

Some embodiments further comprise interpolating the received reference data to match a time corresponding to the received magnetic field data.

Some embodiments relate to a method for allowing power supplied through two cables to be determined, the method comprising:
- receiving first magnetic field data, the magnetic field data relating to a magnetic field generated by a first cable,
- receiving second magnetic field data, the magnetic field data relating to a magnetic field generated by a second cable,
- receiving reference data, the reference data relating to a current supplied to one or more monitored loads powered through the first cable;
- based on the received first magnetic field data and reference data, determining at least one parameter of a first function that relates the magnetic field generated by the first cable to the power supplied though the first cable;
- based on the received first and second magnetic field data and the received reference data, determining at least one parameter of a second function that relates the magnetic field generated by the second cable to the power supplied though the second cable;
- making available the at least one parameter of the first function, so that a power supplied by the first cable can be determined based on the at least one parameter and a magnetic field value; and
- making available the at least one parameter of the second function, so that a power supplied by the second cable can be determined based on the at least one parameter and a magnetic field value;
- wherein the one or more monitored loads are a subset of all the loads powered through the first cable, and wherein the second cable is connected to a negative load that offsets the load through the first cable.

Some embodiments relate to a method for determining power supplied through two cables, the method comprising:
- receiving first magnetic field data, the magnetic field data relating to a magnetic field generated by a first cable,
- receiving second magnetic field data, the magnetic field data relating to a magnetic field generated by a second cable,
- receiving reference data, the reference data relating to a current supplied to one or more monitored loads powered through the first cable;
- based on the received first magnetic field data and reference data, determining at least one parameter of a first function that relates the magnetic field generated by the first cable to the power supplied though the first cable;
- based on the received first and second magnetic field data and the received reference data, determining at least one parameter of a second function that relates the magnetic field generated by the second cable to the power supplied though the second cable;
- based on the at least one parameter of the first function and a magnetic field value relating to a magnetic field generated with respect to the first cable, determining a power supplied by the first cable; and
- based on the at least one parameter of the second function and a magnetic field value relating to a magnetic field generated with respect to the second cable, determining a power supplied by the second cable;
- wherein the one or more monitored loads are a subset of all the loads powered through the first cable, and wherein the second cable is connected to a negative load that offsets the load through the first cable.

According to some embodiments, the second magnetic field data is used to adjust the received first magnetic field data to compensate for the effects of the current through the second cable on the magnetic field caused by the current through the first cable.

In some embodiments, the at least one parameter of the second function is a negative load proportionality factor.

In some embodiments, the negative load proportionality factor is determined by:
- calculating the at least one parameter of the first function;
- calculating the power through the first cable;
- determining the negative load proportionality factor to be a value such that, according to some error measure, the difference between the calculated changes in power through the second cable determined using the negative load proportionality factor, and the calculated changes in power through the first cable, is minimised.

According to some embodiments, the at least one parameter of the first function is a whole-of-premises proportionality factor.

In some embodiments, the received reference data corresponds to the same time period as the received first magnetic field data and the received second magnetic field data.

Some embodiments further comprise interpolating the received reference data to match a time period corresponding to the first received magnetic field data and/or the second received magnetic field data.

In some embodiments, the negative load is a photovoltaic (PV) system.

According to some embodiments, the received magnetic field data comprises a plurality of measurements for each time period.

Some embodiments further comprise combining the plurality of measurements into a single magnetic field value by:
- initialising a vector of magnetic field measurements to arbitrary values;
- determining an influence vector based on the initialised vector and the received magnetic field data;
- determining an approximate single magnetic field value based on a product of the influence vector and the received magnetic field data;
- upon determining that the approximate single magnetic field value and the influence vector have not converged, repeat the determining an influence vector and determining an approximate single magnetic field value steps;
- upon determining that the approximate single magnetic field value and the influence vector have converged, determining a weight vector based on the influence vector; and
- determining the single magnetic field value based on the weight vector and the received magnetic field values.

In some embodiments, the received magnetic field strength data and/or the received reference data comprise complex signals representing magnitude and phase.

According to some embodiments, where the received magnetic field strength data and the received reference data have an arbitrary phase offset, the method further comprising determining the arbitrary phase offset.

According to some embodiments, the phase offset changes over time, and determining the phase offset comprises comparing the timing of at least two zero crossings observed in the electric field near the cable to the independently known timing of the corresponding zero crossings of the voltage present in the cable.

In some embodiments, the phase offset changes over time, and determining the phase offset comprises measuring electric field harmonic data generated by the cable, measuring the corresponding voltage harmonic data, and detecting matching changes in the harmonic data.

According to some embodiments, the phase offset changes over time, and determining the phase offset comprises measuring electric field harmonic data generated by the cable, and determining the phase offset based on an observation that actual voltage harmonics are reasonably close to constant.

In some embodiments, at least one of the first cable and the second cable comprises two or more conductors.

Some embodiments relate to a method of determining power supplied through a cable, the method comprising:
  receiving magnetic field data, the magnetic field data relating to a magnetic field generated by the cable;
  receiving at least one parameter of a function that relates the magnetic field generated by the cable to a power supplied though the cable; and
  based on the at least one parameter and the magnetic field data, determining a power supplied by the cable;
  wherein the parameter of a function that relates the magnetic field generated by the cable to a power supplied though the cable is determined by performing the method of some other embodiments.

Some embodiments relate to a method for determining power supplied through two cables, the method comprising:
  receiving first magnetic field data, the magnetic field data relating to a magnetic field generated by a first cable,
  receiving second magnetic field data, the magnetic field data relating to a magnetic field generated by a second cable,
  receiving at least one parameter of a first function that relates the magnetic field generated by the first cable to the power supplied though the first cable;
  receiving at least one parameter of a second function that relates the magnetic field generated by the second cable to the power supplied though the second cable;
  based on the at least one parameter of the first function and a magnetic field value related to a magnetic field generated by the first cable, determining a power supplied by the first cable; and
  based on the at least one parameter of the second function and a magnetic field value related to a magnetic field generated by the second cable, determining a power supplied by the second cable;
  wherein the parameter of a function that relates the magnetic field generated by the cable to a power supplied though the cable is determined by performing the method of some other embodiments.

Some embodiments relate to a device for determining power supplied through a cable, the device comprising:
  a processor; and
  a memory storing program code;
  wherein the processor is configured to access and execute the program code, and wherein executing the program code causes the processor to perform the method of some other embodiments.

Some embodiments relate to a system comprising the device of some other embodiments, and a sensor device configured to measure and send the magnetic field data.

Some embodiments further comprise a sensor device configured to measure and send the reference data.

BRIEF DESCRIPTION OF DRAWINGS

Embodiments are described in further detail below, by way of example and with reference to the accompanying drawings, in which.

DETAILED DESCRIPTION

Figure 1:
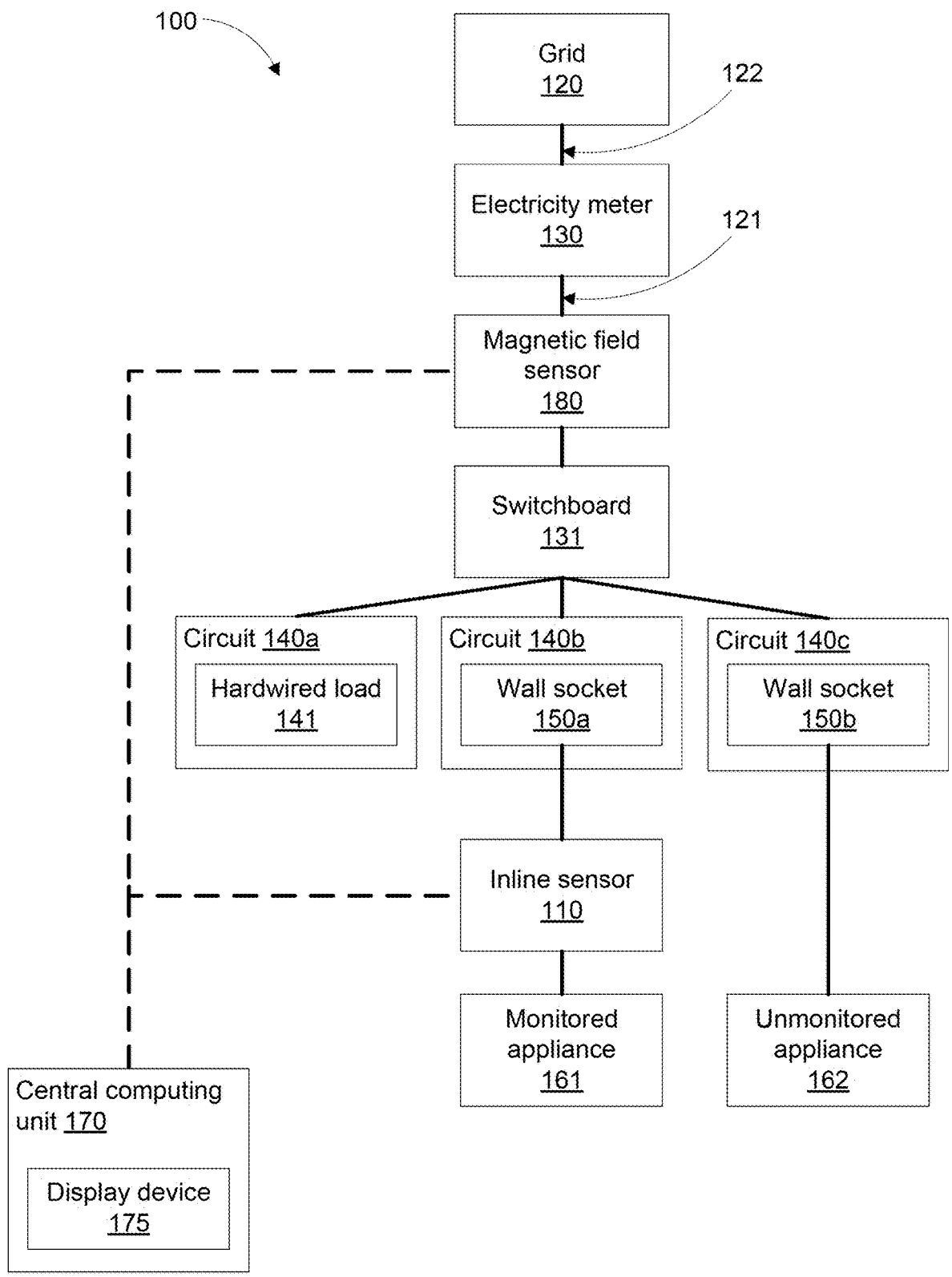
FIG. 1 shows a block diagram of a system for monitoring power generation and consumption according to some embodiments.

Described embodiments generally relate to power monitoring. In particular, described embodiments are directed to systems, methods and devices for measuring power consumption and generation.

Current transformers (CTs) and Rogowski coils are commonly used to measure current flowing through a conductor by detecting the induced magnetic field in a closed path around the conductor. Applying this approach to measure current in a home environment has several drawbacks. Typical electrical wiring in the home contains two conductors (active and neutral) which have equal and opposing current flows which tend to cancel the magnetic field for any path encircling the cable. Separating the active and neutral conductors in a power cord, multi-core cable or conduit in order to make a measurement on a single conductor is not practical. To overcome these difficulties, the present systems and methods use point measurements of the residual magnetic field generated by a current flowing through a conductor pair to obtain a measure of the current flowing through the conductors.

Some embodiments relate to systems, methods and devices for determining the parameters of a function which translates a contactless measurement of a magnetic field around a cable into the power transmitted through that cable.

Some embodiments relate to systems, methods and devices for using the determined parameters to determine the power transmitted through the cable.

PCT application WO 2017/152243, the contents of which are incorporated by reference herein in their entirety, describes a method and device for contactless measuring of power consumed by or generated by an appliance. This measurement is derived based on a measurement of the residual magnetic field around an unmodified multi-conductor cable.

When a current flows through a conductor, a circular magnetic field is induced in the plane perpendicular to the conductor. The strength of this magnetic field is proportional to the amount of current flowing, and diminishes linearly with distance from the conductor. For an AC current, the field reverses direction at the same time as the current reverses direction. Thus, measuring the strength of the reversing magnetic field provides a means to measure the amount of current. Measuring the field along a closed path encircling the conductor provides a result that only depends on the current through the conductor, but is independent of the shape and location of the encircling path.

However, encircling two conductors carrying equal but opposite current (as is the case in a standard AC cable) results in two equal but opposite magnetic fields being induced, which exactly cancel each other out along any such path. The resulting net field is zero. In common two or three conductor AC cables, individually insulated conductors for Active ("A"), Neutral ("N") and optionally Earth ("E") are placed next to each other, and encased in a second layer of insulator, which provides both additional insulation and structural integrity to the cable. During normal operation, the current in the Active conductors and the Neutral conductors are equal but opposite in direction. Any current in the Earth conductor is generally a sign of a dangerous malfunction, and in modern installations will trigger a Residual Current Device ("RCD"). Based on this, it is reasonable to assume zero current through any Earth Conductor.

While integrating the magnetic field along a path encircling both the Active conductor and the Neutral conductor will always result in a net field of zero, this does not mean that the sum of magnetic fields from the two conductors is zero in any given place, due to the difference in the position of the Active conductor to the Neutral conductor in the cable.

Figures 9A, 9B:
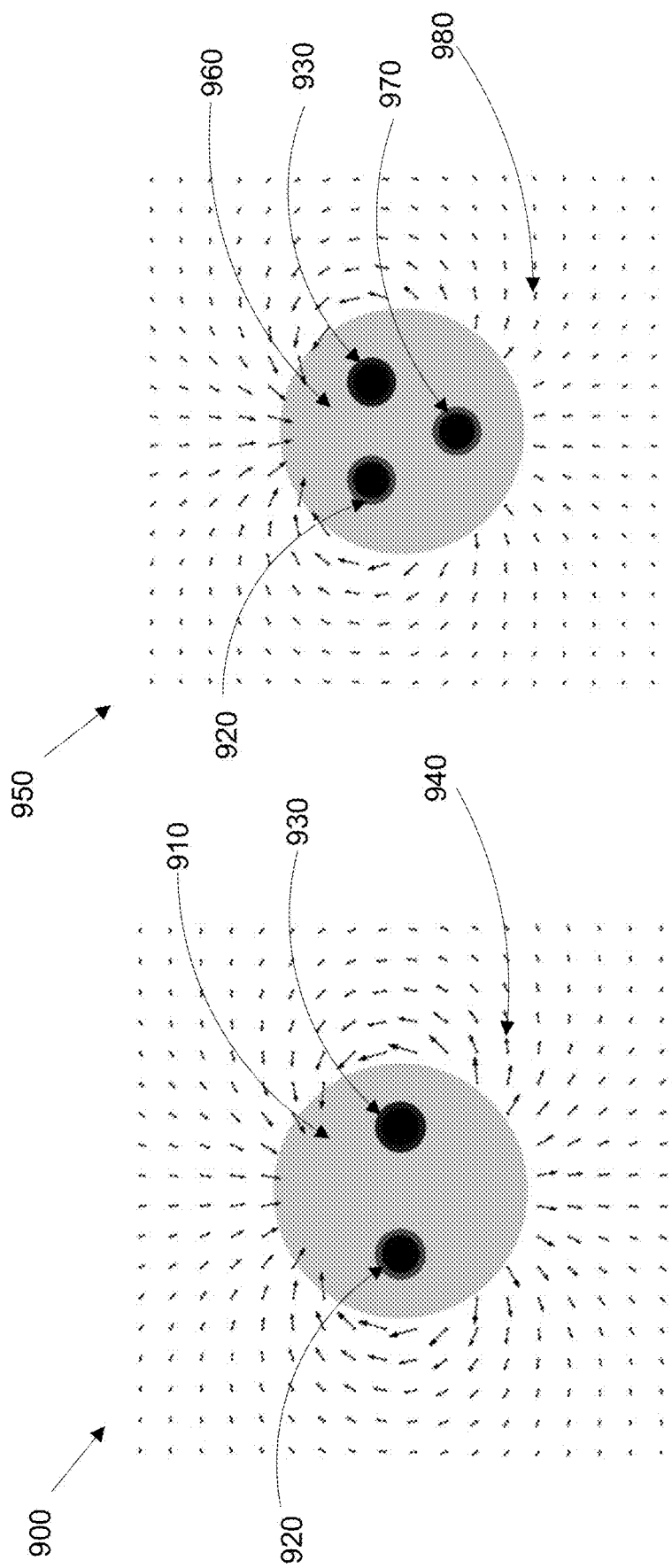
FIG. 9A shows a cross section of a two-conductor cable showing the residual magnetic field.
FIG. 9B shows a cross section of a three-conductor cable showing the residual magnetic field.

FIGS. 9A and 9B illustrate the magnetic fields produced by two and three conductor cables, showing cross sections 900 and 950 of a two conductor cable 910 and a three conductor cable 960, respectively. Cables 910 and 960 each include conductor pairs consisting of Active conductor 920 and Neutral conductor 930. Three conductor cable 960 further includes an Earth conductor 970. FIG. 9A shows a residual field 940, being the addition of an Active field generated by Active conductor 920 with a Neutral field generated by Neutral conductor 930. FIG. 9B shows a residual field 980, being the addition of an Active field generated by Active conductor 920 with a Neutral field generated by Neutral conductor 930.

A significant residual field 940/980 exists at the surface of cables 910 and 960, which rapidly diminishes with distance away from cables 910 and 960, roughly proportional to the square of the distance away from the cable 910/960. While the direction and exact strength of residual field 940/980 at any point on the surface of cable 910/960 is dependent on the relative geometry of that point and conductors 920 and 930, there are in fact no points in which residual field 940/980 is zero, or even vanishingly small. Thus, a direct measurement in any particular single point on or near the surface of cable 910/960 will observe a significant residual field 940/980. The strength of residual field 940/980 is proportional to the amount of current flowing through conductors 920 and 930, even though the proportionality factor and the direction of field 940/980 vary from point to point.

As the measurement of the magnetic field provides only a relative indication of the power, the method described in PCT application WO 2017/152243 relates to determining a proportionality factor to allow an absolute power measurement to be determined from the measured magnetic field. This proportionality factor is determined based on reference data relating to the power consumed or generated by the appliance.

PCT application WO 2017/152243 specifically describes a method to determine the proportionality factor where the magnetic field is measured with respect to a single monitored appliance, and the reference data relates to independent absolute power measurements for an aggregate of the monitored appliance and a plurality of other, unmonitored appliances, other loads and/or other generators. For example, the monitored appliance may be an air conditioner or a photovoltaic system, and the reference data may be obtained from an intelligent electricity meter which monitors the overall electricity consumption (or generation) of a premise.

Embodiments described in the present application address an alternative case. Specifically, described embodiments relate to determining a proportionality factor and other parameters where the magnetic field is measured with respect to an aggregate of several separate loads, and the reference data is independent absolute power measurement data relating to one or more of those loads. For example, the magnetic field measurement may relate to the total power consumption of a premise or household, and the reference data may be provided by one or more inline power meters attached to one or more household appliances, in some embodiments.

Continuous measurement of a premise's power consumption may provide valuable insight into consumption patterns and also provide real-time visibility where no smart meter is available to provide the information, or where the available smart meter has limited local connectivity. For example, this may be useful where the smart meter does not provide a Home Area Network, where connection to the Home Area Network requires specialised equipment or processes, or where the Home Area Network is inaccessible due to the smart meter's location.

FIG. 1 shows a power monitoring system 100 for a household or premise. System 100 includes an electricity meter 130 electrically connected to the mains electrical grid 120 by a mains power supply line 122. Electricity meter 130 is then attached to a switchboard 131 with a cable 121. Electrical grid 120 supplies an AC mains voltage, which may be around 50 Hz, 60 Hz, or another frequency in some embodiments. It is to be understood that any specific examples in this document that refer to a specific AC mains frequency, such as 50 Hz, are not limited to that frequency, and that that frequency is only used as an illustrative example.

Cable 121 may be a two conductor cable such as cable 910, or a three-conductor cable such as cable 960 in some embodiments. According to some embodiments, cable 121 may be a multi-conductor cable comprising two or more conductors. Furthermore, it will be apparent to a skilled person that where cable 910 comprises a single conductor current path, this can be treated as a special case of the two conductor scenario, where the second conductor is at a comparatively large physical distance, and thus the residual magnetic field near the first conductor is comparatively strong.

A magnetic field sensor 180 is attached to the cable 121 or 122 at or near meter 130. While sensor 180 may be attached to either cable 121 or 122, for simplicity only cable 121 will be described in the remainder of the application. Any mention of cable 121 should be taken to mean either cable 121 or cable 122.

According to some embodiments, sensor 180 may be similar or the same as the sensor device 200 as described in PCT application WO 2017/152243. Sensor 180 may be configured to generate a magnetic field measurement based on the residual magnetic field produced by cable 121. In some embodiments, sensor 180 may be configured to measure the magnitude (or field strength) of the residual magnetic field. In some embodiments, sensor 180 may be configured to measure both the phase and magnitude of the magnetic field, producing a complex measurement. In some embodiments, sensor 180 may further be configured to measure the electric field generated by cable 121, which may include measuring the phase and magnitude of the harmonics of the electric field. Sensor 180 is described in further detail below with reference to FIG. 10.

According to some embodiments, sensor 180 may generate magnetic field data with a comparatively high update frequency. For example, sensor 180 may generate between 1 update per second and 1 update per minute. According to some embodiments, the measurements generated by sensor 180 may be synchronised or scheduled to cover intervals of time corresponding to the time at which measurements are taken by other sensors in system 100, such as sensor 110. According to some alternative embodiments, sensor 180 may generate data independently for arbitrary and non-synchronised intervals of time.

Switchboard 131 splits the power supplied by power supply line 121 into a number of separate circuits 140. While three circuits, being 140a, 140b and 140c, are shown, switchboard 131 may split the supply to more or fewer circuits.

In the illustrated embodiment, some of circuits 140 lead to hardwired loads, while some lead to wall sockets. For example, circuit 140a leads to hardwired load 141, which may comprise lighting, air conditioning, or an electric oven. Circuits 140b and 140c lead to wall sockets 150. While one hardwired load 141 and two wall sockets 150a and 150b are illustrated, system 100 may comprise any combination of any number of hardwired loads 141 and wall sockets 150.

The illustrated embodiment further shows an inline sensor 110 connected to wall socket 150a, with a monitored appliance 161 also connected to inline sensor 110. Appliance 161 may be a refrigerator, washer, dryer, kettle, toaster, television, computer, desk lamp, fan, heater or other appliance. Inline sensor 110 may be a readily available consumer device, such as the TP-Link® HS110, or the Wemo® Insight Smart Plug, for example, or may be a custom device.

Each inline sensor 110 may be configured to measure the power consumed by the respective monitored appliance 161 and to generate power consumption data, which may include at least one of power data, and the combination of current data and voltage data. In some embodiments, sensor 110 may be configured to measure the active power delivered to appliance 161. According to some embodiments, sensor 110 may be alternatively be configured to measure the apparent power delivered to appliance 161. In some embodiments, sensor 110 may also be configured to measure the phase and magnitude of the delivered power or current, producing a complex measurement. In some embodiments, sensor 110 may further be configured to measure the phase and magnitude of the harmonics of the mains voltage.

According to some embodiments, inline sensor 110 may generate power consumption data with a comparatively high update frequency. For example, inline sensor 110 may generate between 1 update per second and one update per minute. According to some embodiments, the measurements generated by sensor 110 may be synchronised or scheduled to cover intervals of time corresponding to the time at which measurements are taken by sensor 180. According to some alternative embodiments, sensor 110 may generate data independently for arbitrary and non-synchronised intervals of time.

An unmonitored appliance 162 is connected directly to wall socket 150b. Appliance 162 may be a refrigerator, washer, dryer, kettle, toaster, television, computer, desk lamp, fan, heater or other appliance. While one monitored appliance 161 and one unmonitored appliance 162 are illustrated, system 100 may include one or more monitored appliances 161 each connected to an inline sensor 110, and may optionally also include one or more unmonitored appliances 162.

System 100 also comprises a central computing unit 170. Computing unit 170 may comprise one or more computing devices and/or server devices, such as one or more servers, databases, and/or processing devices in communication over a network. According to some embodiments, computing unit 170 may be located in proximity to electricity meter 130. In some embodiments, computing unit 170 may be located remotely. According to some embodiments, computing unit 170 may form part of a sensor 110 or 180. According to some embodiments, computing unit 170 may comprise sensor 110 or 180.

According to some embodiments, computing unit 170 may comprise a cloud based server system. Computing unit 170 may also comprise one or more display devices 175 configured to make data available for presentation purposes. Display devices 175 may comprise devices such as desktop computers, laptop computers, smart phones, tablets, screens, LED displays, and/or other display devices. According to some embodiments, data may additionally or alternatively be displayed on display components of sensors 110 or 180 (not shown). These components may include display screens, LEDs, or other user output components.

System 100 may be configured to monitor energy consumed and generated by appliances 161, and to monitor the total energy consumed and generated by loads and appliances 141, 161 and 162, and to make this information available through display devices 175. The energy data derived from system 100 may include instantaneous or live power, energy consumption, and energy generation for homes with photovoltaic (PV) systems, as described below with reference to FIG. 2, which may include gross PV energy, net energy and gross household energy consumption.

Magnetic field sensor 180 and inline sensors 110 may be configured to communicate measured data to central computing unit 170. This data may be communicated via a wired or wireless communication protocol, such as Ethernet, Wi-Fi, or Bluetooth, for example.

Figure 10:
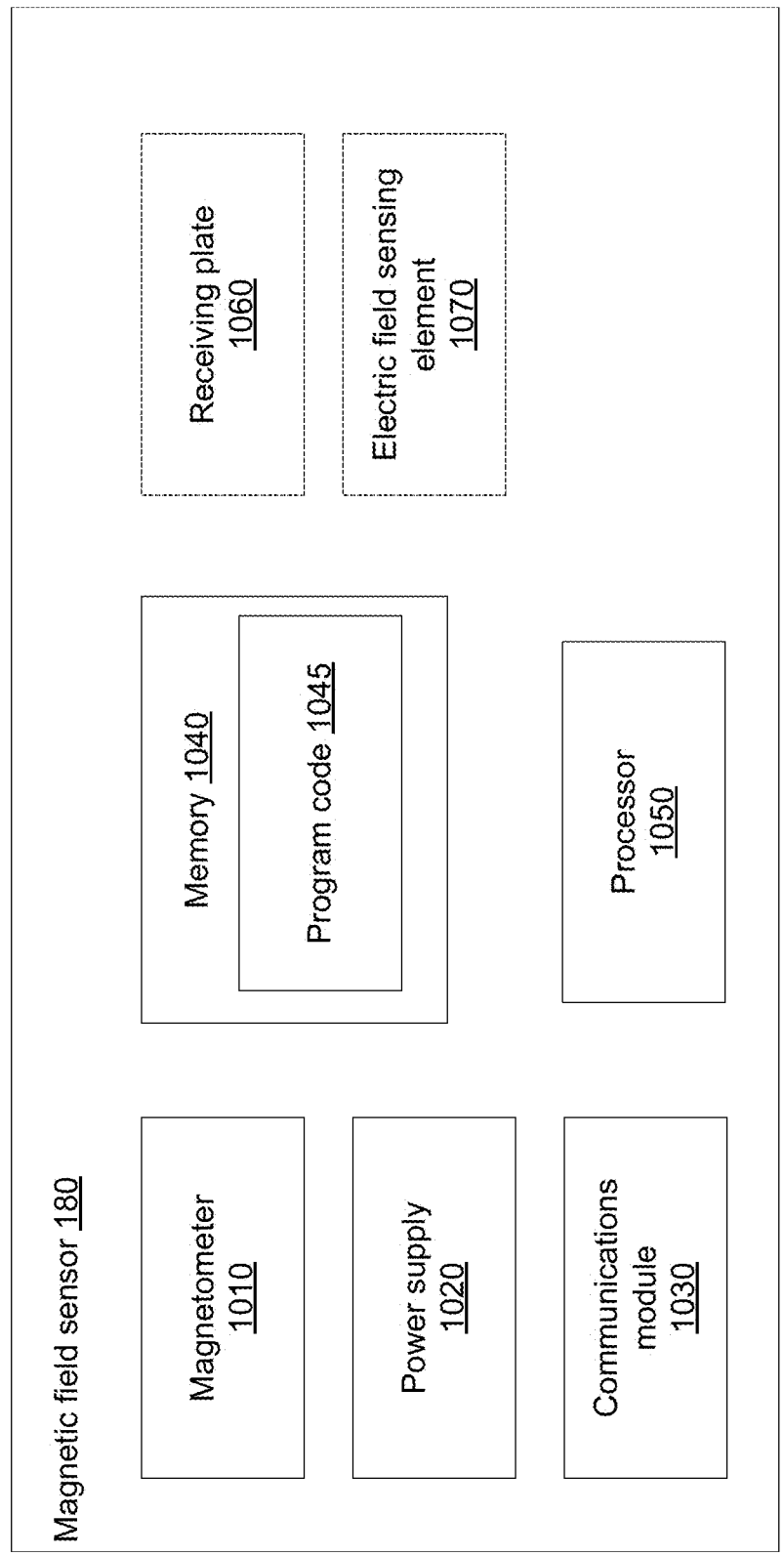
FIG. 10 shows a block diagram of a sensor device that may form part of the systems of FIGS. 1 and 2 according to some embodiments.

FIG. 10 shows magnetic field sensor 180 in further detail. Sensor 180 may be configured to determine a measurement corresponding to the AC current which is flowing through cable 121 by measuring the residual magnetic field produced by cable 121. The measurement determined by sensor 180 can then be used along with data from inline sensors 110 to calculate the current and power transferred through cable 121, as described in further detail below with reference to FIGS. 4 to 8. Sensor device 180 may include a magnetometer 1010, a power supply 1020, a communications module 1030, a processor 1050 and memory 1040. According to some embodiments, sensor device 180 may include more than one magnetometer 1010.

Sensor 180 may be configured to be positioned in proximity to, but on the outside of, the outer insulation of cable 121. This attachment method means that the operation of sensor 180 does not rely on making electrical contact with the mains power supply as delivered by cable 121. This makes sensor 180 easy to install, as it does not require cable 121 to be spliced or disconnected.

Magnetometer 1010 may be configured to be positioned directly adjacent to cable 121, and to experience and measure a residual magnetic field produced by cable 121. As cable 121 is connected to grid 120, this magnetic field will oscillate at the mains frequency (e.g. 50 Hz in Australia), and will be proportional in strength to the current flowing through cable 121. Magnetometer 1010 will also be affected by the Earth's magnetic field, and possibly by magnetic fields from permanent magnets (e.g. from magnetic toys, or from motors) and electromagnets (e.g. from speakers or magnetic door locks) in the vicinity of magnetometer 1010. In most cases, these additional fields would not oscillate at or near the mains frequency. Magnetometer 1010 may communicate the measured magnetic field data to processor 1050.

Sensor 180 may be powered by a power supply 1020, which may include at least one battery in some embodiments. According to some embodiments, sensor 180 may be configured to be able to be battery-powered for extended periods of time, such as for 1, 2, 3, 4, 5 or more years.

Communications module 1030 may receive data from processor 1050, and communicate data to and/or receive data from one or more external networks and devices, which may include central computing unit 170 in some embodiments.

Processor 1050 may include one or more data processors for executing instructions, and may include one or more of a microcontroller-based platform, a suitable integrated circuit, and/or one or more application-specific integrated circuits (ASIC's). Processor 1050 may include an arithmetic logic unit (ALU) for mathematical and/or logical execution of instructions, such as operations performed on the data stored in internal registers of processor 1050.

Processor 1050 may have access to memory 1040. Memory 1040 may include one or more memory storage locations, which may be in the form of ROM, RAM, flash, or other memory types. Memory 1040 may store program code 1045, which may be executable by processor 1050 to cause processor 1050 to communicate with magnetometer 1010 and communications module 1030, and perform functions as described with further detail below. For example, according to some embodiments program code 1045 may be executable by processor 1050 to cause processor 1050 to perform method 700 as described below with reference to FIG. 7.

According to some embodiments, sensor 180 may also optionally comprise a receiving plate 1060 and an electric field sensing element 1070. Receiving plate 1060 may be configured to be capacitively coupled with the conductors of cable 121. Electric field sensing element 1070 may comprise at least one of an impedance converter, analog-to-digital converter, or comparator, and may be configured to allow sensor 180 to measure the electric field signal generated by cable 121. Together, receiving plate 1060 and electric field sensing element 1070 may allow sensor 180 to measure the electric field which emanates from cable 121, as described in further detail below.

Figure 2:
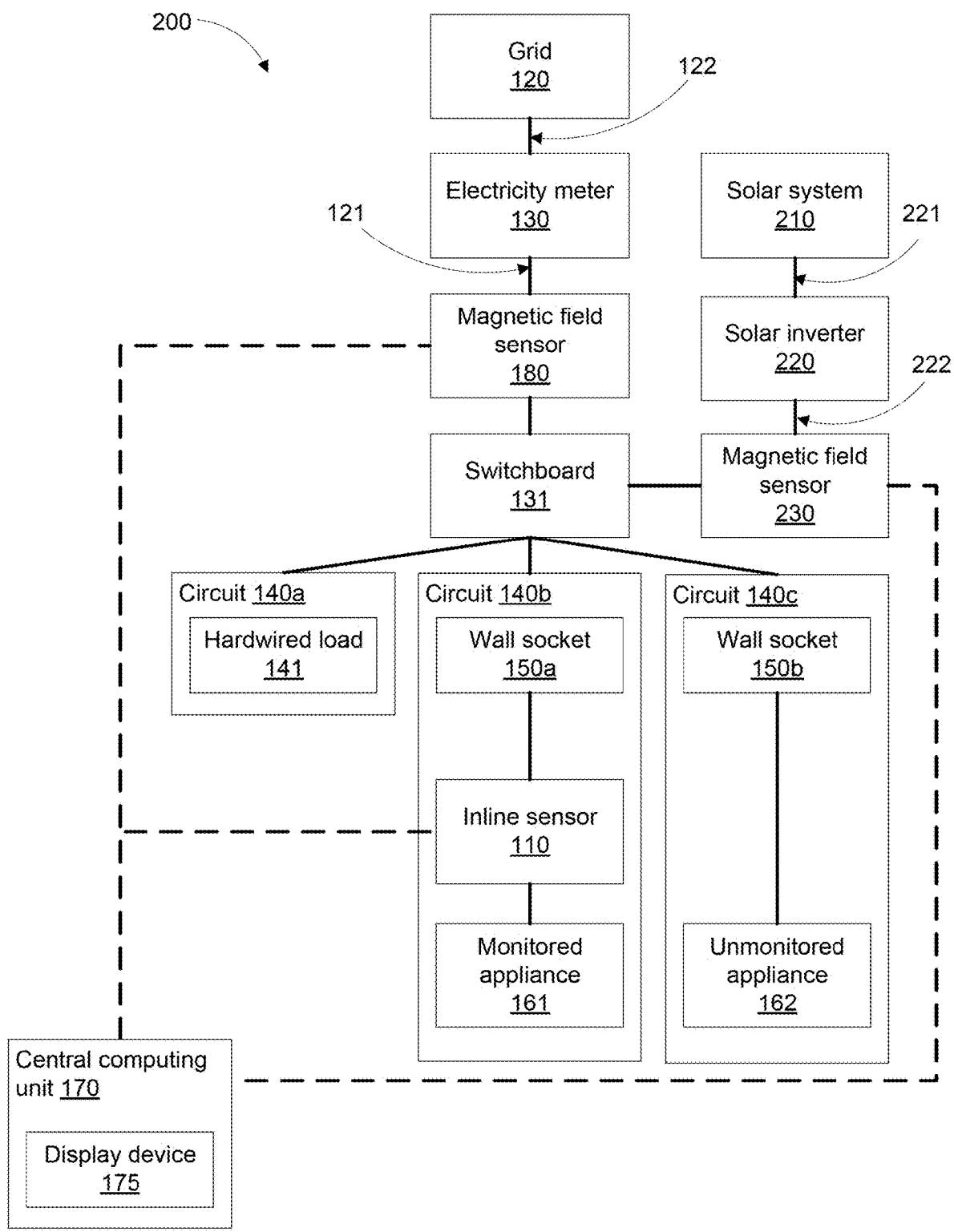
FIG. 2 shows a block diagram of an alternative system for monitoring power generation and consumption according to some embodiments.

FIG. 2 shows an alternative power monitoring system 200. System 200 includes all of the components of system 100, as described above with reference to FIG. 1. System 200 further includes a negative load such as a PV system 210, which may be a rooftop solar panel based PV system in some embodiments. According to some alternative embodiments, system 200 may include a different negative load, such as a wind or water generator, a battery storage device, or other negative load. PV system 210 is connected to the DC input 221 of a PV inverter 220. The AC output cable 222 of PV converter 220 is connected to the cable 121 behind the electricity meter 130, such as via switchboard 131.

Cable 222 may be a two conductor cable such as cable 910, or a three-conductor cable such as cable 960 in some embodiments. According to some embodiments, cable 222 may be a multi-conductor cable comprising two or more conductors.

An additional magnetic field sensor 230 is attached to the AC output cable 222, in a location near inverter 220. Sensor 230 may be substantially the same type of sensor as sensor 180, in some embodiments, as described above with reference to FIG. 10. According to some embodiments, sensor 230 may be a different form of magnetic field sensor.

Figure 3:
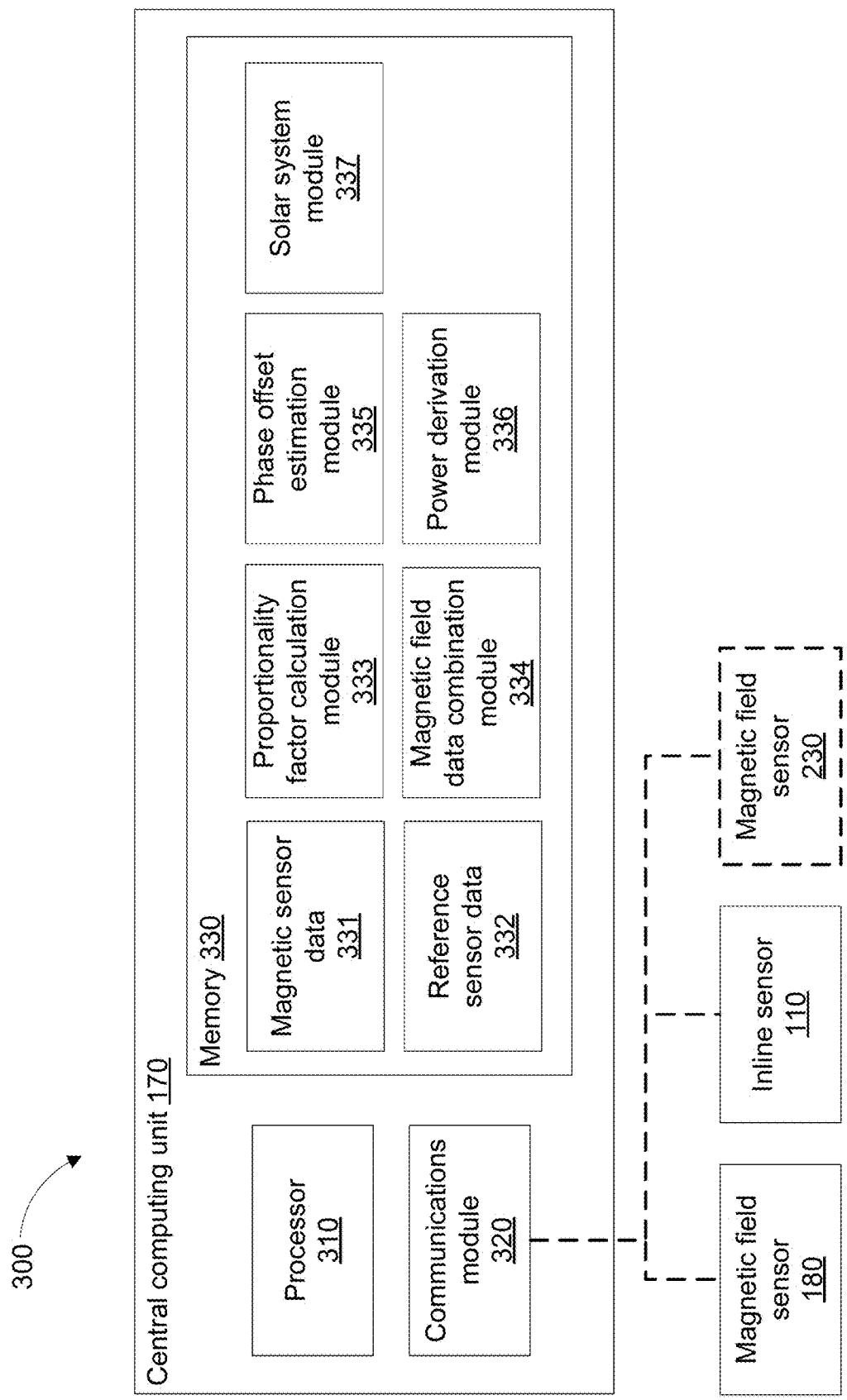
FIG. 3 shows a block diagram of a computing device and sensors that may form part of the systems of FIGS. 1 and 2 according to some embodiments

FIG. 3 shows a diagram 300 of the components of central computing unit 170 in further detail, along with the devices with which computing unit 170 communicates. Central computing unit 170 comprises a processor 310, and a memory 330 accessible to processor 310. Processor 310 may include one or more processor devices, such as one or more of a microcontroller-based platform, a suitable integrated circuit, or an application-specific integrated circuit (ASIC). According to some embodiments, processor 310 may comprise internal registers. In some embodiments, processor 310 may include an arithmetic logic unit (ALU) for mathematical and/or logical execution of instructions. These instructions may be executed as operations performed on the data stored in the internal registers.

Processor 310 has access to memory 330, which may store data and instructions. Processor 310 may be configured to read from and write to the data stored in memory 330, and may be configured to execute instructions stored in memory 330. Memory 330 may include one or more memory storage locations, which may be in the form of ROM, RAM, flash, or other memory types. Memory 330 may store data such as magnetic sensor data 331 and reference sensor data 332. Magnetic sensor data 331 may be received by processor 310 from magnetic field sensors 180 and 230, while reference sensor data 332 may be received by processor 310 from inline sensors 110. Memory 330 may also store a number of executable code modules, including proportionality factor calculation module 333 as described below with reference to FIG. 5, magnetic field data combination module 334 as described below with reference to FIG. 6, phase offset estimation module 335 as described below with reference to FIG. 7, power derivation module 336 as described below with reference to FIGS. 4A and 4B, and PV system module 337 as described below with reference to FIG. 8.

Central computing unit 170 may also comprise a communications module 320, which may be configured to facilitate communication between central computing unit 170 and one or more other devices. For example, communications module 320 may facilitate communications between central computing unit 170 and one or more of magnetic field sensors 180, inline sensors 110 and optionally magnetic field sensors 230. Communications module 320 may facilitate communication via a wired or wireless communications protocol such as Ethernet, Wi-Fi, or Bluetooth, for example.

Referring to system 100 of FIG. 1, central computing unit 170 may be configured to derive the parameters of a function that links a residual magnetic field measured by sensor 180 to a current and therefore a power being delivered by the cable on which sensor 180 is located, such as by cable 121. Specifically, computing unit 170 may be configured to receive magnetic field data from sensor 180, being data that relates to the residual magnetic field produced by the cable 121; and to receive reference data from sensors 110, being data related to the power consumed by one or more monitored loads such as monitored appliance 161. The monitored loads may comprise a subset of all the loads that are powered by cable 121.

Based on the magnetic field data and the reference data obtained over a given period of time, central computing unit 170 may be configured to determine the parameters of a function that relates the measured magnetic field to the total power delivered through the cable. Furthermore, based on the parameters and the measured magnetic field, central computing unit 170 may be configured to determine the total power being supplied by the cable 121, both retrospectively for past magnetic field measurements, and in real-time or close to real-time for present and future magnetic field measurements.

Referring to system 200 of FIG. 2, central computing unit 170 may further be configured to derive the parameters of a function that links a residual magnetic field measured by sensor 230 to a current and therefore a power being delivered by the cable on which sensor 230 is located, such as cable 222, and to also determine the total power being supplied by the cable 222. In particular, this refers to a scenario where the second cable 222 is used to connect a negative load, such as a PV system 210. Central computing unit 170 may be configured to determine separate parameters for each of cables 121 and 222, relating the measured residual magnetic field produced by the cable to the power transmitted through that same cable.

According to some embodiments, central computing unit 170 may be able to derive the relevant parameters and consequently the total power supplied regardless of whether sensors 110, 180 and 230 are synchronised to take measurements at corresponding intervals of time. Furthermore, central computing unit 170 may be able to derive the relevant parameters and consequently the total power supplied regardless of whether sensors 180 and 230 are configured to measure the magnitude of the magnetic field only, or to measure phase and magnitude information, or to measure phase and magnitude of the magnetic field, as well as of the electric field at its base and harmonic frequencies. Central computing unit 170 may also be able to derive the relevant parameters and consequently the total power supplied regardless of whether sensors 110 are configured to measure just the magnitude of power, or to measure just the magnitude of current and voltage, or to measure phase and magnitude information of power, or to measure phase and magnitude of current and voltage, or to measure phase and magnitude information of current or power and phase and magnitude information of the voltage at the base frequency as well as at harmonic frequencies.

A detailed description of the methods performed by components of systems 100 and 200 to determine the power delivered by cable 121 based on the measurements generated by sensors 110, 180 and optionally 230 will now be discussed with reference to FIGS. 4A to 8.

Figure 4A:
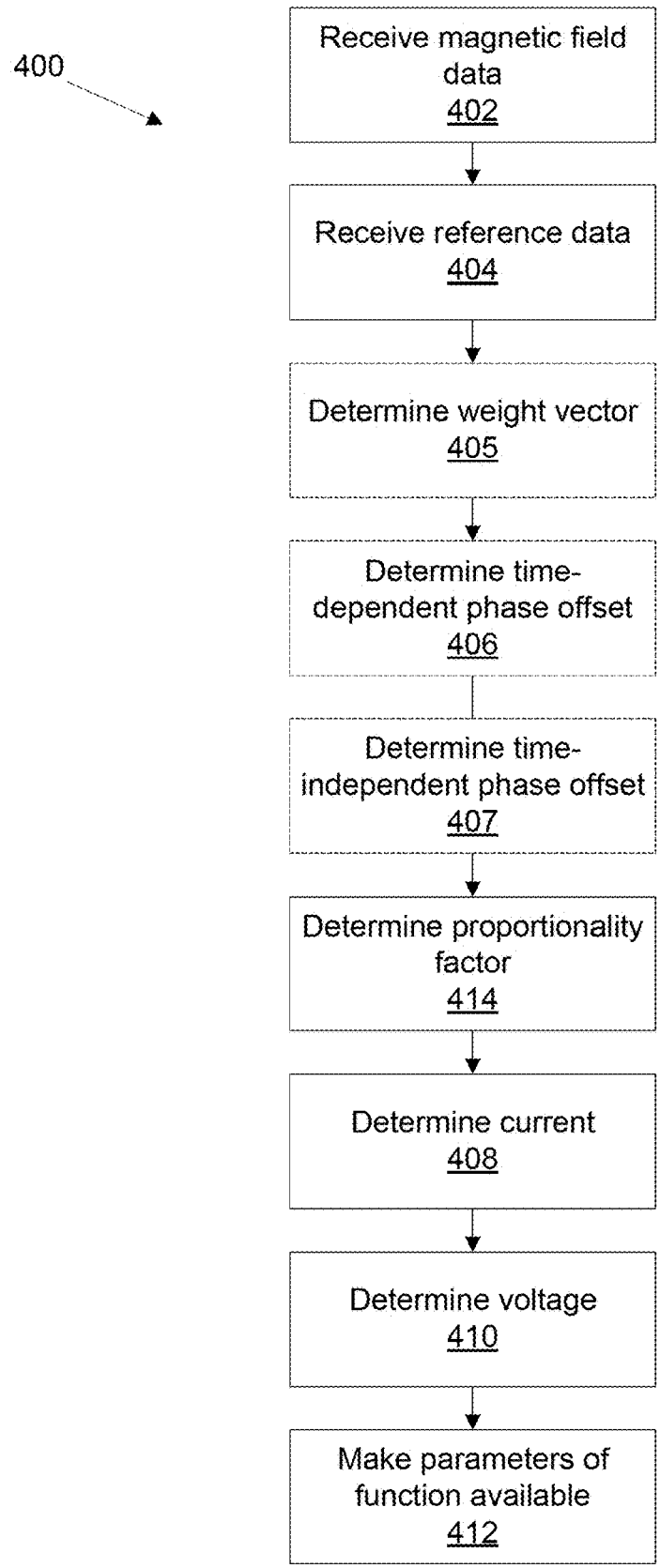
FIG. 4A shows a flowchart of a method for calculating the parameters necessary to determine power consumption as performed by the systems of FIGS. 1 or 2 according to some embodiments.

FIG. 4A shows a method 400 for calculating the parameters of a function to relate the residual magnetic field measured by sensor 180 to the current I delivered by cable 121, using the magnetic field measurements generated by magnetic field sensor 180. Method 400 may be performed by processor 310 executing power derivation module 336.

Method 400 comprises receiving magnetic field data at step 402, receiving reference data at step 404, and determining a proportionality factor based on the received data linking the magnetic field data to the current I delivered by cable 121 at step 414. The method further comprises determining the current flowing through cable 121, determining a voltage broadly representative of the voltage present on cable 121, and subsequently making each of the determined parameters, including the proportionality factor, and the voltage, available for further processing, to allow the power delivered by cable 121 to be determined, as described below with reference to method 450.

The parameters determined by method 400 may only be determined once for system 100, or may be determined periodically to account for any changes in system 100 over time. Once these parameters have been calculated based on past magnetic field data and past reference data, they can be used to determine the power through cable 121 in the future without needing to re-execute any of the steps of method 400, and without requiring further reference data. Instead, future power through cable 121 can be determined by applying the determined parameterised formula to new magnetic field measurements, as described below in further detail with reference to method 450.

Method 400 also includes a number of optional steps, 405, 406 and 407, which may be used to produce a more accurate result in certain circumstances. For example, optional step 405 may be used where the magnetic field data received at step 402 comprises multiple axes of measurements for each measurement time. Optional step 406 may be used where the magnetic field data received at step 402 comprises complex values exhibiting a phase offset from the reference data, and where the phase offset varies over time. Optional step 407 may be used where the magnetic field data received at step 402 comprises complex values exhibiting a phase offset from the reference data, and where the phase offset does not vary over time, or where a time-invariant phase offset remains after the application of step 406.

At initial step 402 of method 400, communications module 320 of unit 170 receives magnetic field data from magnetic field sensor 180, relating to residual magnetic field data and optionally the electric field data measured by sensor 180 in proximity to a cable, such as cable 121. According to some embodiments, at least two magnetic field values at two times, $t_1$ and $t_2$, are measured by sensor 180 and communicated to communications module 320. In practice, sensor 180 may measure many magnetic field values over a long period of time. Processor 310 executing power derivation module 336 stores the received data in magnetic sensor data 331.

At step 404, which may be performed before, during or after step 402, communications module 320 receives reference data from one or more inline sensors 110, relating to current and optionally voltage measured by each sensor 110 being delivered by a cable to a monitored appliance, such as appliance 161. According to some embodiments, at least two reference values at two times, $t_1$ and $t_2$, are measured by each sensor 110 and communicated to communications module 320. In practice, sensor 110 may measure many reference values over a long period of time. Processor 310 executing power derivation module 336 stores the received data in reference sensor data 332.

As noted above, where magnetic field sensor 180 comprises multiple sensor elements for sensing the magnetic field in multiple axes and therefore provides multiple magnetic field measurements f comprising multiple axes for each measured time $t_1$ and $t_2$, processor 310 executing power derivation module 336 may be configured to also perform optional step 405.

At optional step 405, processor 310 calculates a weight vector h to allow the multiple magnetic field measurements f to be transformed into a single magnetic field signal G, as described below with further reference to FIG. 6. Also at step 405, processor 310 then applies the weight vector h to the magnetic field measurements f to determine a single magnetic signal value G from a given tuple of magnetic field measurements f using the equation:

$$G(t)=h \cdot f(t)$$

As noted above, where time-dependent phase information is to be taken into account, processor 310 executing power derivation module 336 may be configured to also perform optional step 406. In other words, processor 310 may be configured to perform step 406 only when the magnetic field measurement is complex, there is a phase offset between the magnetic field data and the reference data, and phase offset changes over time, which may be in response to environmental changes, for example.

At optional step 406, processor 310 calculates a time-dependent phase difference $\Phi(t)$ between the phase of the data measured by magnetic field sensor 180 and the phase of the data measured by inline sensor 110, as described below with further reference to FIG. 7A, to allow the phase of each type of data to be aligned.

Where time-independent phase information is to be taken into account, processor 310 executing power derivation module 336 may be configured to also perform optional step 407. In other words, processor 310 may be configured to perform optional step 407 when the magnetic field measurement is complex, there is a phase offset, and that phase offset is not changing over time. According to some embodiments, even where the phase offset is changing over time, processor 310 may be configured to perform step 407 to calculate the constant absolute offset component of the phase offset.

At optional step 407, processor 310 calculates the time-independent phase difference $\phi$ between the phase of the data measured by magnetic field sensor 180 and the phase of the data measured by inline sensor 110, as described below with further reference to FIG. 7B, to allow the phase of each type of data to be aligned.

At step 414, processor 310 executing power derivation module 336 then calculates a proportionality factor p based on the magnetic field data measured by magnetic field sensor 180 and stored in magnetic sensor data 331, and at least one reference current measured by an inline sensor 110 and stored in reference sensor data 332. Step 406 is described in further detail below with reference to FIG. 5.

After completing step 414, processor 310 executing power derivation module 336 may be configured to perform step 408. At step 408, processor 310 determines the current I(t) flowing through cable 121 at each time t for which the magnetic data received at step 402 is available.

Where optional steps 405, 406 and 407 were not performed, at step 408 processor 310 may determine the current I(t) flowing through cable 121 using the equation:

$$I(t)=p \cdot G(t)$$

Proportionality factor p is calculated at step 414 using method 500, and the magnetic field data G(t) is retrieved from magnetic sensor data 331.

Where magnetic field sensor 180 comprises multiple sensor elements and therefore provides magnetic field measurements f comprising multiple axes, and therefore where processor 310 also performs optional step 405 using method 600, at step 408 processor 310 may determine the current I flowing through cable 121 using the equation:

$$I(t)=p^*(h \cdot f(t))=(p^* h) \cdot f(t)$$

Proportionality factor p is calculated at step 414 using method 500, the weight vector h is calculated at step 405 using method 600, and the magnetic field data f(t) is retrieved from magnetic sensor data 331.

Where time-independent phase information is to be taken into account, and therefore where processor 310 also performs optional step 407, at step 408 processor 310 may determine the current I flowing through cable 121 using the equation:

$$I(t)=(\text{rot}(\phi)^* p^* h) \cdot f(t)$$

Proportionality factor p is calculated at step 414 using method 500, the weight vector h is calculated at step 405 based on method 600, the time-independent phase offset $\phi$ is calculated at step 407, and the magnetic field data f(t) is retrieved from magnetic sensor data 331. The constant phase offset $\phi$ may be applied by using:

$$\text{rot}(\phi)=\cos \phi + i \sin \phi$$

Where the phase information is time dependent and therefore where processor 310 also performs optional step 406 based on method 700, the time-dependent phase variations may be taken into account by instead using the formula:

$$I(t)=(\text{rot}(\phi+\alpha(t))^* p^* h) \cdot f(t),$$

where $\phi$ refers to the time-independent component of the phase offset only.

Where both time-independent and time-dependent variations are to be taken into account, the processor 310 may instead use formula:

$$I(t)=(\text{rot}(\Phi(t))^* p^* h) \cdot f(t),$$

where, $\Phi(t)$ refers to the combined time-independent and time-independent variations to the phase offset $\phi+\alpha(t)$.

Proportionality factor p is calculated at step 414 using method 500, the weight vector h is calculated at step 405 based on method 600, the phase offset $\Phi(t)$ is calculated at step 406 based on method 700, and the magnetic field data f(t) is retrieved from magnetic sensor data 331. The actual phase offset $\Phi(t)$ may be a combination of the constant component $\phi$ as calculated at step 407 and a component $\alpha(t)$ that varies over time as calculated at step 406, in some embodiments.

Once processor 310 has determined the current using the appropriate formula, at step 410 processor 310 executing power derivation module 336 may determine a single representative voltage at cable 121.

The parameters determined in steps 402 to 414 relate the magnetic field measurements to current through the cable. In order to calculate power, this current must be multiplied with the voltage supplied by the cable.

One way of determining the voltage supplied by cable 121 is by using the voltage measurements V(t) provided by inline sensors 110. However, this can have a number of drawbacks due to the inaccuracies of combining data from multiple devices, which would require precise timing of signals between the devices to produce an accurate result. Further drawbacks would arise from the cost, in terms of battery life of sensor 180, to communicate the voltage from inline sensor 110 to sensor 180, to enable sensor 180 to perform method 450.

An alternative approach is to instead us a fixed voltage value $\hat{V}$. While this fails to accurately reflect changes in power caused by changes in time-dependent voltage V(t), for any one household the range of values taken by V(t) over time tends to be quite narrow, and the error introduced by approximating V(t)≈$\hat{V}$ tends to be minor, as long as $\hat{V}$ is chosen appropriately.

Because the most common reason for wanting to measure the power through a cable is to monitor energy usage, one way to choose a fixed voltage $\hat{V}$ is such that the amount of energy $\hat{E}$ calculated using fixed voltage $\hat{V}$, being:

$$\hat{E} = \hat{V} \sum_t |I(t)|$$

is the same as the amount of energy E calculated using the actual voltage V(t), being:

$$E = \sum_t |I(t) * V(t)|$$

This gives $\hat{V}$ as $$\hat{V} = \sum_t |I(t) * V(t)| \bigg/ \sum_t |I(t)|$$

Therefore, at step 410 processor 310 executing power derivation module 336 determines the voltage at cable 121 to be a weighted average of the observed voltages V(t), weighted to give more importance to observations from times of high current, and thus high power, compared to times of low current, and thus low power.

Regardless of whether the current I(t) is real-valued or complex, the voltage V(t) will always be real-valued. The phase of a complex voltage V(t) relative to the voltage phase would, by definition, be 0, and thus the imaginary part of such a complex V(t) is also guaranteed to be zero.

At step 412, processor 310 executing power derivation module 336 makes the parameters determined at one or more of steps 405, 406, 407, 414 and 410 available for further processing. This step may include processor 310 sending one or more of the determined parameters to one or more of sensors 110, 180 or 230. Alternatively or additionally, this step may include processor 310 storing one or more of the determined parameters in memory 330, for subsequent retrieval and processing by processor 310 or another device.

Figure 4B:
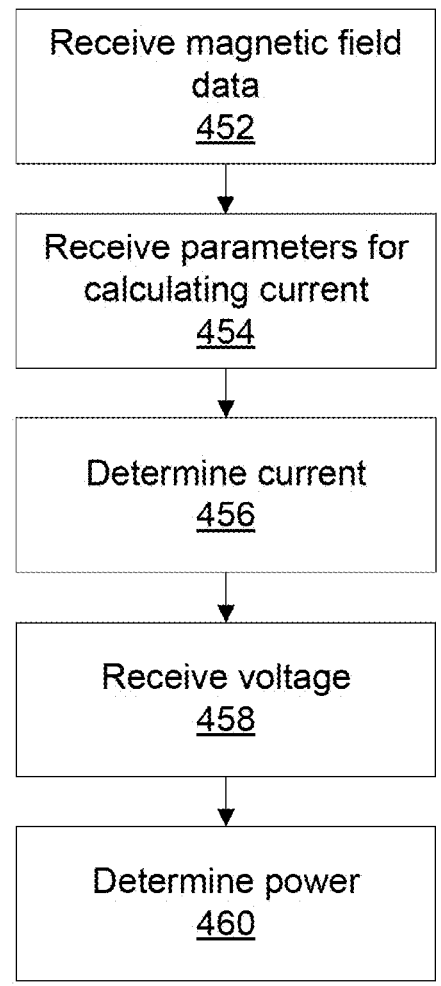
FIG. 4B shows a flowchart of a method for calculating power consumption performed by the systems of FIGS. 1 or 2 according to some embodiments.

FIG. 4B shows a method 450 for determining the power supplied by cable 121. While the method below is described as being performed by sensor 110, method 450 may be performed by one or more of processor 310 or sensors 110, 180 or 230.

At step 452, sensor 110 receives the magnetic field data generated by sensor 180. Where method 450 is being performed by sensor 180, step 452 may comprise generating the data. Otherwise, the step may comprise retrieving the data from memory 330 or being sent the data.

At step 454, sensor 110 receives the parameters required for calculating the current flowing through cable 121, as determined at steps 405 to 414 of method 400. These parameters may be retrieved from memory 330, or may be sent to sensor 110 in some embodiments. According to some embodiments, where the parameters have been received once from an external device such as central computing device 170 and stored in memory 330, in subsequent iterations of method 450, the parameters may be retrieved from memory 330.

At step 456, sensor 110 determines the current I(t) using the received parameters and an appropriate equation, as described above with reference to step 408 of method 400. Alternatively, according to some embodiments, sensor 110 may receive the current as calculated at step 408 of method 400 and may not need to independently perform this calculation.

At step 458, sensor 110 either obtains the actual voltage V(t) from an appropriate source, such as from a measurement obtained by sensor 110, or alternatively receives/retrieves the representative voltage $\hat{V}$ determined at step 410 of method 400 to use in place of V(t). The voltage value may be retrieved from memory 330, or may be sent to sensor 110 in some embodiments.

At step 460, sensor 110 then determines the power P(t) supplied by cable 121, based on the current I(t) calculated at step 456 and the voltage V(t) received at step 458. This is done by transforming the equation for deriving power based on known current and voltage:

$$P(t) = I(t) * V(t)$$

Sensor 110 calculates P(t), which can then be displayed on an integral display device, sent to computing unit 170 for display on display device 175 or to be stored in memory 330, or communicated to another external device.

Referring back to FIG. 4, further details relating to the execution of steps 405, 406, 407 and 414 of method 400 are now described below with reference to FIGS. 5, 6, 7A and 7B.

Figure 5:
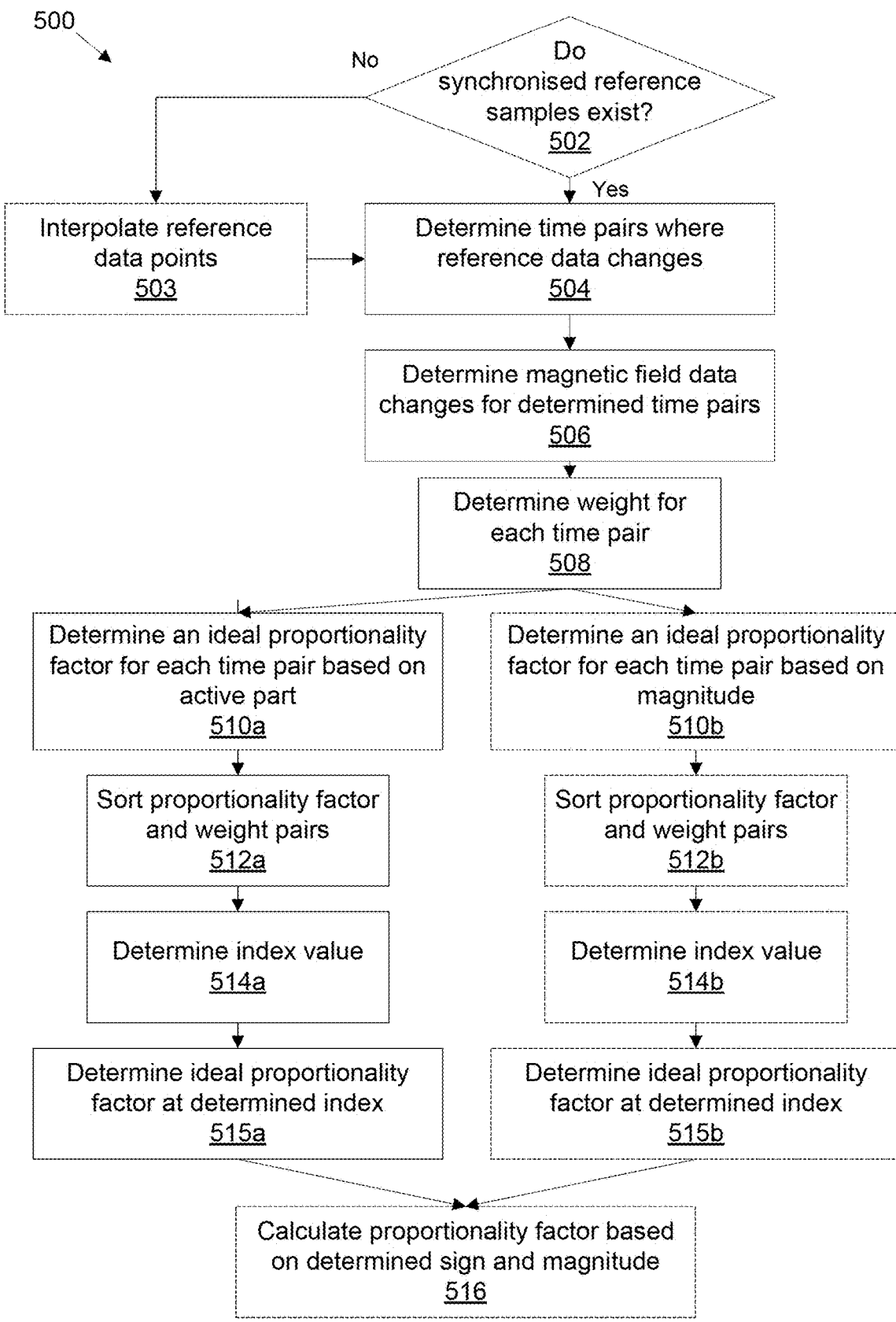
FIG. 5 shows a flowchart of a method for calculating a proportionality factor for the system of FIG. 1 according to some embodiments.

FIG. 5 illustrates a method 500 for calculating a proportionality factor p. Method 500 may be performed by processor 310 executing step 414 of method 400. Proportionality factor p links the residual magnetic field G measured by sensor 180 to the current I delivered by cable 121 for system 100 as shown in FIG. 1. Method 500 may be performed by processor 310 executing proportionality factor calculation module 333.

As the magnetic field G measured by sensor 180 is proportional to the current I delivered by cable 121, calculating I from G can be done using the equation:

$$I = p * G,$$

where p is a proportionality factor which depends only on the location and orientation of sensor 180 relative to the conductors in cable 121. In order to calculate p, it is therefore necessary to obtain known values for I and G for a given location and orientation of sensor 180.

In order to determine the proportionality factor p and therefore enable current and power measurements to be derived based on a measured magnetic field G, central computing unit 170 performs method 500, as described below. Method 500 specifically relates to determining proportionality factor p based on data received from magnetic sensor data 331 and reference sensor data 332, where reference sensor data 332 includes data relating to the current delivered to monitored appliances 161.

Designating the total current delivered to the household or premise being monitored via cable 121 as I and the current to each load or appliance i in the household as $A_i$, the appliance currents sum up to the total household current:

$$I = \sum_i A_i$$

Further designating the differences between currents at two arbitrary times $t_1$ and $t_2$ $I(t_2)-I(t_1)=\Delta I$ and $A_i(t_2)-A_i(t_1)=\Delta A_i$, the same relation holds true, with the change in the total household current being the sum of the changes to the individual appliance currents:

$$\Delta I = \sum_i \Delta A_i$$

Given a total of M appliances or other loads in the household, of which the first N are monitored appliances 161, this equation can be further modified to:

$$\Delta I = \sum_{i=1}^{N} \Delta A_i + \sum_{i=N+1}^{M} \Delta A_i$$

In this equation, the term $\sum_{i=1}^{N}\Delta A_i$ describes the change in total current to the monitored appliances 161, and the term $\sum_{i=N+1}^{M}\Delta A_i$ describes the change in total current to hard-wired loads 141 and unmonitored appliances 162.

The current consumed by most household appliances or loads tends to take on one of a small number of distinct levels, and for most appliances or loads, transitions from one level to another are relatively rare. This means that as long as the time difference $\Delta t = t_2 - t_1$ is relatively small, there is a high chance for any appliance or load i that the change in current is zero or close to zero:

$$\Delta A_i \approx 0$$

This means that under the same condition, there is a high chance that the total change in current to hard-wired loads 141 and unmonitored appliances 162 is also zero or close to zero:

$$\sum_{i=N+1}^{M} \Delta A_i \approx 0$$

Thus, the change in total current delivered by cable 121 to the household can be estimated as being equal to the sum of the change in current delivered to the monitored appliances 161:

$$\Delta I \approx \sum_{i=1}^{N} \Delta A_i$$

As noted above, the magnetic field G measured by sensor 180 is proportional to the current delivered by cable 121:

$$I = p * G$$

Because $I=p*G$ implies $\Delta I=p*\Delta G$, whenever $\Delta t=t_2-t_1$ is relatively small, there is a high chance that the change in residual field is proportional to the change in total current to only the monitored appliances 161:

$$p * \Delta G \approx \sum_{i=1}^{N} \Delta A_i$$

Of course, there is also a high chance that $\sum_{i=1}^{N}\Delta A_i \approx 0$, or in other words that the total current to the monitored appliances 161 also remains largely unchanged. However, if the monitored appliances 161 are used at all, there will be times $t_1$ and $t_2$ such that $\Delta t=t_2-t_1$ is relatively small and yet the total current supplied to the monitored appliances 161 is not close to zero:

$$\left| \sum_{i=1}^{N} \Delta A_i \right| \gg 0$$

Method 500 uses these principles to determine proportionality factor p based on data received from magnetic sensor data 331 and reference sensor data 332

Method 500 begins at step 502. Having stored magnetic field data measured by magnetic field sensor 180 in magnetic sensor data 331 and reference data measured by an inline sensor 110 in reference sensor data 332 during steps 402 and 404 of method 400, processor 310 retrieves data 331 and 332 and checks whether synchronised reference samples exist. In other words, processor 310 checks whether there exists at least one time pair $t_1$ and $t_2$ for which both magnetic sensor data 331 and reference sensor data 332 exist. In practice, there may exist a large number of distinct time pairs $t_1$ and $t_2$ for which both magnetic sensor data 331 and reference sensor data 332 exist. Determining time pairs $t_1$ and $t_2$ for which both magnetic sensor data 331 and reference sensor data 332 exist allows for the relationship between the magnetic sensor data 331 and the reference sensor data 332 to be determined.

Processor 310 may have access to the necessary time pairs $t_1$ and $t_2$ where inline sensors 110 and magnetic field sensor 180 can keep accurate time and can be synchronized to measure and generate data at the same times. For example, either or both of inline sensors 110 and magnetic field sensor 180 may be programmable or customisable in terms of the sampling schedule and frequency. According to some embodiments, all sensor devices 110 and 180 may be programmed to take a sample 5 seconds, 25 seconds, and 45 seconds after the start of each minute, for example. The devices 110 and 180 may take snapshot measurements at the designated times, or may report an average magnetic field or current since the last report. However, all devices 110 and 180 should use the same reporting system. Furthermore, neither the sample scheduling nor the sampling method need be fixed; and devices 110 and 180 may constantly renegotiate the sampling details based on previous measurements.

According to some embodiments, at least one device may sample at a higher frequency than others, allowing the other devices to dynamically adjust their sampling frequency without the need for negotiations. For example, a mains-powered inline sensor 110 may take a sample every 5 seconds, while a battery-powered sensor 180 may choose to sample every 5, 10, 20 or 30 seconds, depending on the level of change it is observing from inline sensor 110. As long as there are times $(t_1, t_2)$ for which samples are available from all devices 110 and 180, processor 310 executing proportionality factor calculation module 333 proceeds to step 504.

If there do not exist times $t_1$ and $t_2$ for which magnetic sensor data 331 and reference sensor data 332 exist, processor 310 executing proportionality factor calculation module 333 performs an interpolation step 503. This may occur when it is impossible or impractical to precisely schedule the sampling strategies of devices 110 and/or 180. For example, this may be the case where inline sensors 110 are off-the-shelf devices. In this case, processor 310 must perform step 503 to estimate currents $A_i(t_1)$ and $A_i(t_2)$ for monitored devices 161 at times $t_1$ and $t_2$ by interpolating from the available data points $A'_i(t_j)$ at nearby times $t_j$. Processor 310 may use a number of interpolation techniques, which may be selected based on the sampling schedule and strategy of the inline sensor 110. Regardless of method used, the interpolation may introduce uncertainty into the values for $A_i(t_1)$ and $A_i(t_2)$. However, this uncertainty is minimised when the variation across the $A'_i(t_j)$ used is minimised.

This directly conflicts with the selection criteria for $t_1$ and $t_2$ as described below with reference to step 504, which require them to both be close to each other, and for significant change in the monitored load to have occurred between them. As a consequence, where it is necessary for processor 310 to perform step 503 due to sampling by sensors 110 and 180 samples being unsynchronised, $t_1$ and $t_2$ may be chosen such that there is a slightly longer interval between them than when the sampling is synchronised. For reasons described below, there is a tradeoff between reducing the interpolation-caused uncertainties in the total change in current between times $t_1$ and $t_2$ and reducing the chance of there being a significant change in the current to any unmonitored appliances 162 or hardwired loads 141.

Having completed steps 502 and optionally step 503, processor 310 executing proportionality factor calculation module 333 proceeds to step 504.

At step 504, processor 310 executing proportionality factor calculation module 333 determines all times for which the reference data 332 changes, or all pairs of $(t_1, t_2)$ for which $|\Sigma_{i=1}^N \Delta A_i| \gg 0$, and for which the difference between $t_1$ and $t_2$ is relatively small. Processor 310 stores the set of pairs in memory 330. The set of such pairs $(t_1, t_2)$ may be designated as T.

At step 506, processor 310 executing proportionality factor calculation module 333 determines the change in the measured magnetic field data $\Delta_{t_1,t_2} G$ for each pair $(t_1, t_2) \in T$, by reading from magnetic sensor data 331.

To determine proportionality factor p, processor 310 next executes a robust estimator of some kind to determine the optimal p which results in the observed current changes in the monitored loads $\Sigma_{i=1}^N \Delta_{t_1,t_2} A_i$ being as similar as possible to the changes in current derived from the magnetic measurements, $p^* \Delta_{t_1,t_2} G$, across all $(t_1, t_2) \in T$, for some robust measure of similarity.

According to some embodiments, as described in further detail below with reference to steps 508 to 516 of method 500, processor 310 may determine the optimal p using a weighted median algorithm as the robust estimator. However, a person skilled in the art would recognise that a wide array of other methods or measures may be used in place of the weighted median algorithm, without significantly changing the outcome of method 500.

At step 508, processor 310 executing proportionality factor calculation module 333 also determines a weight $v_j$ for each time pair $s_j$. Each weight $v_j$ is used to determine how much weight to give to a corresponding proportionality factor $p_j$ in the subsequent steps, which use a weighted median approach to calculate a final proportionality factor.

The precise calculation of $v_j$ depends on a number of factors, such as sampling frequencies, whether or not some samples needed to be interpolated, and even the expected variability of the unmonitored loads. Processor 310 may follow a number of rules in calculating the $v_j$. For example, the larger the time gap between the time pair, $\Delta t = t_2 - t_1$, the smaller the corresponding $v_j$, because a larger $\Delta t$ means a larger risk of unmonitored load currents having changed. The larger the total monitored load current $\Sigma_{i=1}^N \Delta_j A_i$ is, the larger the corresponding $v_j$, because the larger the total known current change in the monitored load is, the less relative error will be caused by any coincidental current changes in unmonitored loads. Also, the more change is observed in the measured residual magnetic field G or any current $A_i$ just before $t_1$ or just after $t_2$, the smaller the corresponding $v_j$, especially when the current $A_i$ has to be interpolated by processor 310 performing step 405. This is because activity at those times introduces uncertainty into the measured values, and thus ultimately into the calculated $p_j$.

After step 508, processor 310 applies the weighted median approach to calculating the proportionality factor by performing steps 510a, 512a, 514a and 515a, as described below.

In some embodiments, magnetic field sensor 180 may be configured to measure the residual magnetic field G as a simple, real-valued or scalar measure of the magnitude of the oscillating residual magnetic field caused by the current through cable 121. According to some alternative embodiments, magnetic field sensor 180 may be configured to not only sense the magnitude of the residual magnetic field produced by cable 121, but also its phase relative to the phase of the electric field, and thus relative to the phase of the voltage supplied by cable 121. The resulting magnetic field measurement G may be expressed as a complex number, with a real part which describes the component of the magnetic field in phase with the voltage, and an imaginary part which describes the magnetic field component at 90 degrees out of phase with the voltage. The real part may be called the active part, because the power resulting from the current which produces this component is active power. The imaginary part may be called the reactive part, because the power resulting from the current that produces this component is reactive power.

For embodiments where sensor 180 provides real-valued measurements, steps 510a to 515a are performed using these measurements directly. For alternative embodiments, where the measurements are complex-valued, steps 510a to 515a are performed using only the real, or active, part of the measurements.

According to some embodiments, inline sensors 110 may be configured to provide a simple, real-valued measure of active power, and may not provide a measurement of the reactive part of the measured power. This may be the case where sensors 110 are off-the-shelf components, for example. In some embodiments, sensors 110 may provide an apparent power measurement in addition to the active power measurement. This may be provided by sensor 110 directly, or may be deduced by processor 310 from the voltage and current measurements received from sensor 110. In other cases, sensor 110 may be configured to provide a phase angle, or a phase angle may be deduced by processor 330 based on a power factor received from sensor 110. However, calculating a complex current $A_i$ from such deduced values tends to produce inaccuracies, particularly when the total observed power is low or is of a highly reactive nature, or if the load current is strongly non-sinusoidal.

In some embodiments, inline sensors 110 may measure and report the complex current $A_i$ directly. For example, inline sensors 110 may be custom designed sensors configured to measure complex currents.

Where inline power sensors 110 only provide a simple, real-valued measure of current, that measure will be used directly in steps 510a to 515a. Where inline sensors 110 either provide complex-valued measurements of current, or complex-valued current measurements can be derived from the measurements provided, steps 510a to 515a will use the real, or active, part of those measurements.

At step 510a, processor 310 executing proportionality factor calculation module 333 determines an ideal proportionality factor by finding the value for p which optimises some error measure E defined as $$E_{t_1,t_2} = p * \Delta_{t_1,t_2} G - \sum_{i=1}^{N} \Delta_{t_1,t_2} A_i$$

across all $(t_1, t_2) \in T$.

Because the change in the residual magnetic field $\Delta_{t_1,t_2} G$ is proportional to the combined change of current to all appliances and loads 141, 161 and 162 between $t_1$ and $t_2$, but $\sum_{i=1}^{N} \Delta_{t_1,t_2} A_i$ is only the combined change of current to the monitored appliances 161, the error $E_{t_1,t_2}$ will be large even for the correct value of p in the rare case that the current to any of the unmonitored loads 141 or 162 changes significantly between $t_1$ and $t_2$. Thus, it is important that an error measure is chosen that is robust against outliers.

Taking the set T of sampling time pairs $s_j=(t_1, t_2)_j$ that has been determined at step 504, at step 510a of method 500 processor 310 executing proportionality factor calculation module 333 determines, for each $s_j \in T$, the value $p_j$ which would result in $E_j = p * \Delta_j G - \sum_{i=1}^{N} \Delta_j A_i$ being 0. In other words, processor 310 determines the value of the proportionality factor p that, for each particular pair of sample times, perfectly relates the observed change in the magnitude of the magnetic field measured by sensor 180 to the total observed current change to the monitored loads 161 as measured by sensors 110:

$$p_j = \left( \sum_{i=1}^{N} \Delta_j A_i \right) \bigg/ (\Delta_j G)$$

Where sensors 110 and 180 provide complex measurements, processor 310 may determine the value of the proportionality factor p using the modified equation:

$$p_j = \text{R}\left( \sum_{i=1}^{N} \Delta_j A_i \right) \bigg/ \text{R}(\Delta_j G)$$

At step 512a, processor 310 executing proportionality factor calculation module 333 sorts all the pairs of proportionality factors and weights $(p_j, v_j)$ as calculated at steps 508 and 510a into a new list $(q_j, w_j)$, such that the $q_j$ are sorted for ascending j. In other words, the pairs of proportionality factors $p_j$ and weights $v_j$ are sorted by the value of the proportionality factors $p_j$.

At step 514a, processor 310 executing proportionality factor calculation module 333 chooses an index k such that:

$$0.5 \sum_j w_j \geq \sum_{j=1}^{k} w_j$$

and $$0.5 \sum_j w_j < \sum_{j=1}^{k+1} w_j$$

for the weights as sorted at step 512a. In other words, a total weight is calculated by summing all the weights $w_j$, then the list is scanned while summing the weights until the sum exceeds half of the calculated total weight.

At step 515a, processor 310 executing proportionality factor calculation module 333 then determines an appropriate proportionality factor p. According to some embodiments, this can be done by interpolating between $q_k$ and $q_{k+1}$ based on the index k determined at step 514a. In some embodiments, p may simply be chosen as $p=q_k$. Where at least one of the magnetic field measurements from sensor 180 and the current measurements from sensors 110 are real-valued, the determined proportionality factor p is the final proportionality factor p, and method 500 ends at step 515a. The calculated proportionality factor can then be used by processor 310 executing method 400 to calculate a current I at step 408 as described in further detail above with reference to FIG. 4A.

Where both the magnetic field measurements from sensor 180, and the current measurements from sensors 110, are complex-valued, the determined proportionality factor p could also be used as the final proportionality factor p. However, in typical complex measurements, the magnitude information may have considerably lower uncertainty than the phase information. Therefore, according to some embodiments, processor 310 simultaneously or sequentially to steps 510a to 515a executes additional steps 510b to 515b. These steps are identical to 510a to 515a, except that the $p_j$ are calculated based on magnitude of the complex measurements, rather than the real, or active, parts:

$$p_j = \left| \sum_{i=1}^{N} \Delta_j A_i \right| \bigg/ |\Delta_j G|$$

In practice, the alternative proportionality factor $\hat{p}$ determined in step 515b tends to be more accurate than the p determined in step 515a.

However, the proportionality factor $\hat{p}$ calculated in steps 510b to 515b based on magnitudes is always positive, even if the correct proportionality factor is negative. To correct this, where the magnetic field measurements are complex, processor 310 executing proportionality factor calculation module 333 may determine the final proportionality factor p in step 516 by combining the sign of p as determined in step 515a with the magnitude of $\hat{p}$ as determined in step 515b.

The calculated proportionality factor can then be used by processor 310 executing method 400 to calculate a current I at step 408.

Figure 6:
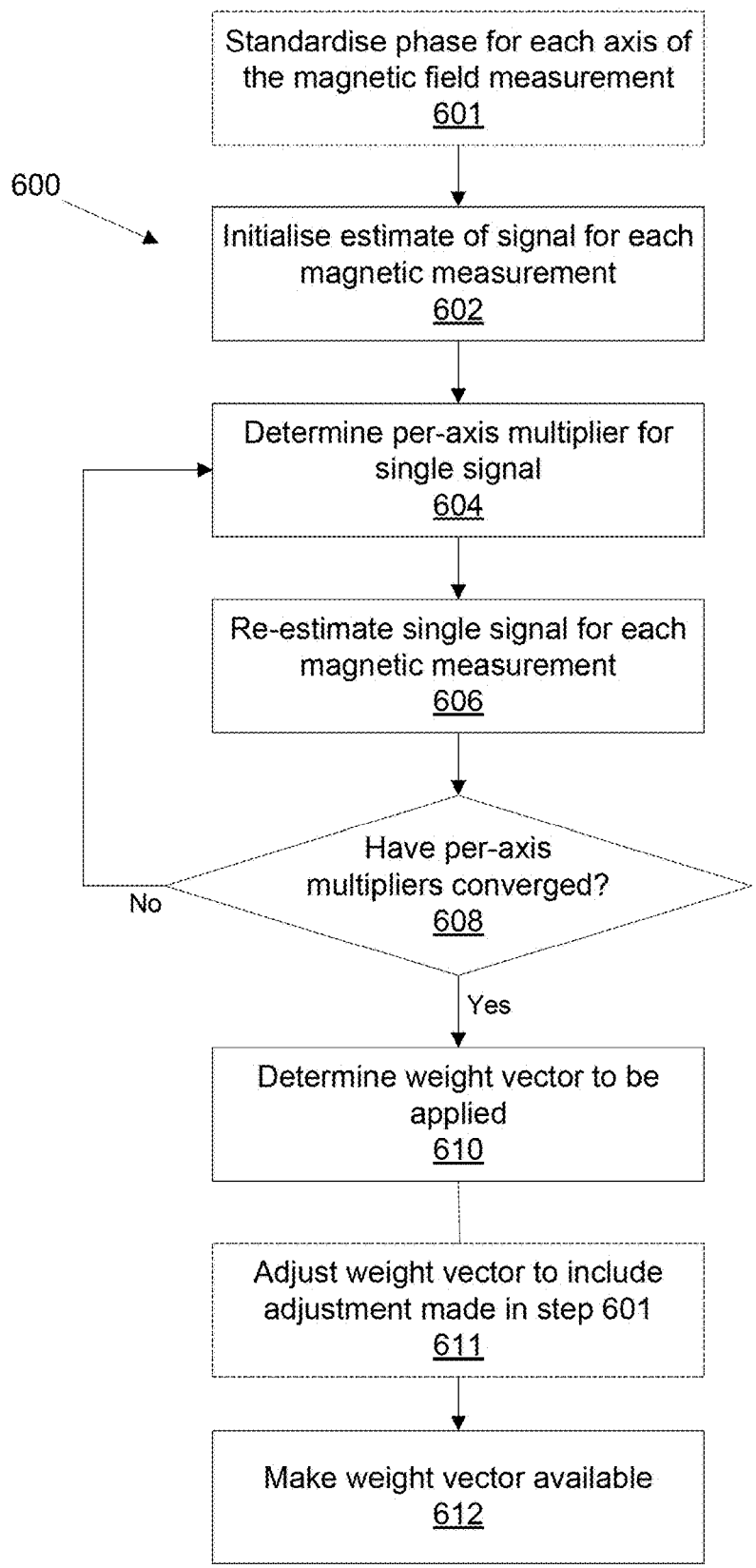
FIG. 6 shows a flowchart of a method for calculating the parameters of a transform to allow a single magnetic field value to be calculated from a magnetic field measurement comprising multiple measurement axes according to some embodiments.

FIG. 6 shows a flowchart depicting method 600, being a method for determining the parameters of a transform that reduces a multi-axes magnetic field measurement into a single signal.

According to some embodiments, magnetic field sensor 180 may be a one-dimensional sensor having a single measuring element which measures the magnetic field along one well-defined direction, resulting in magnetic field G being one-dimensional. As the geometry of the residual magnetic field produced by cable 121 depends on the internal geometry of the conductors inside the cable, and because the orientation of the sensor 180 relative to cable 121 is not well-defined, such a single-dimensional measurement runs the risk of measuring in a direction essentially perpendicular to the actual magnetic field, and may thus fail to register a signal in some embodiments.

In some embodiments, magnetic field sensor 180 may have more than one measuring element. For example, magnetometer 1010 of magnetic field sensor 180 may comprise a three axis magnetometer in some embodiments. Such sensors are readily and cheaply available, thanks to their use in the compass functions of mobile phones. Where magnetometer 1010 comprises a three axis magnetometer, sensor 180 may produce three separate measurements $g_x$, $g_y$, and $g_z$, corresponding to the magnetic field strength along each of its principal axes. According to some embodiments, to reduce the effect of measurement noise, sensor 180 may comprise more than one magnetometer 1010. In such embodiments, for each sample time t, sensor 180 may produce a tuple f of P separate measurements:

$$f=(g_{x,1}, g_{y,1}, g_{z,1}, g_{x,2}, g_{y,2}, g_{z,2}, g_{x,3}, \ldots).$$

Ignoring which magnetometer 1010 each signal came from and which axis of magnetometer 1010 it came from, this tuple may be referred to simply as $f=(g_a, g_b, g_c, \ldots)$. Each individual g may be real-valued if only magnitude is measured, or a complex number if magnitude and phase are measured.

According to some embodiments, processor 310 executing proportionality factor calculation module 333 may perform method 500 as described above with reference to FIG. 5 with P-dimensional input vectors f from sensor 180.

However, according to some alternative embodiments, processor 310 may at optional step 405 of method 400 combine the P distinct g measurements in vector f into the single signal G as used by the specific implementation of method 500 described above by determining a weight vector h, as described in further detail above with reference to FIG. 4A. This may result in a more efficient calculation process.

Processor 310 may combine the distinct g in f into the single signal G by determining a weight vector h such that the dot product of f and h gives G=h·f. In this algorithm, G is the inferred underlying signal, or the signal caused by the current running through the cable 121. All of the observations f should be explainable from the underlying signal G. To determine G, processor 310 may execute magnetic field data combination module 334, causing processor 310 to perform method 600.

Where g and G are real-valued, the components of the weight vector h are real-valued, and can be readily calculated by processor 310.

In embodiments where the magnetic field measurements g and G are complex, the elements of determined vector h are still real-valued, at least in principle. That is because all magnetometer axes of sensor 180 should, in principle, observe signals g at the same phase as that of the single underlying signal G.

However, in reality, sensor 180 may sample the three axes in sequence, rather than concurrently. As a result, there may exist well-defined, measurable time offsets $o_b$, $o_c$, ... between the sampling times for axis a and any of the axes b, c, ..., of roughly ⅓ or ⅔ of the sensor 180's sample time. These time offsets translate into corresponding per-axis phase offsets. Those phase offsets are consistent, and can be measured precisely.

Where g and G are complex-valued and phase offsets exist between the observations f, processor 310 may begin method 600 as shown in FIG. 6 by performing optional step 601 to adjust the phase of the observations to account for these differences. For these embodiments, processor 310 executing magnetic field data combination module 334 multiplies each component g of each observation f with the inverse of the known phase offset for axis k, to achieve matching phase for all components g.

At step 602 of method 600, processor 310 executing magnetic field data combination module 334 initialises an estimate of a single underlying signal for each magnetic measurement. Specifically, given N samples of magnetic field data $f_1 \ldots f_N$ with the number of samples being larger than the number of separate measurements N>>P, processor 310 executing magnetic field data combination module 334 initialises a vector of underlying signal values $G_1 \ldots G_N$ to some arbitrary values. For example, processor 310 may initialise the vector of underlying signal values $G_1 \ldots G_N$ to the measurements from the first axis of the first magnetometer of sensor 180, being $g_{a,1} \ldots g_{a,N}$.

At step 604, processor 310 executing magnetic field data combination module 334 determines a per-axis multiplier for the single underlying signal value to best approximate actual magnetic measurements. Processor 310 does this by solving the over-determined equation system $G_j * \hat{h} = f_j$ for influence vector $\hat{h}$, with j=1 ... N. Influence vector $\hat{h}=(\hat{h}_a, \hat{h}_b, \ldots)$ is the inferred strength of the magnetic field produced by G on each of the individually measured magnetometer directions a, b, .... According to some embodiments, processor 310 may solve for $\hat{h}$ using least squares. Performing step 604 causes processor 310 to estimate the relative strength and direction of the magnetic field along the measured magnetometer axes of sensor 180, based on the observed measurements f along these axes and the current estimate for the corresponding underlying signal G At step 606, processor 310 executing magnetic field data combination module 334 re-estimates the single underlying signal value for each magnetic measurement to best approximate the actual magnetic measurements. Processor 310 does this by determining a single underlying signal value $G_j$ for each sample j by solving each equation $G_j * \hat{h} = f_j$ with j=1 ... N for $G_j$. According to some embodiments, processor 310 may solve for $G_j$ using least squares. Performing step 606 causes processor 310 to estimate the underlying signal G based on the observed measurements f and the current estimate of the relative strength and direction $\hat{h}$.

At step 608, processor determines whether the per-axis multipliers $\hat{h}$ have converged. If not, processor 310 returns to step 604, calculating $\hat{h}$ for the updated vector of magnetic field estimates $G_1 \ldots G_N$ as determined at step 606. As both steps 604 and 606 minimise the same error measure, performing steps 604 to 608 iteratively is guaranteed to eventually cause $\hat{h}$ and $G_j$ to converge.

If the per-axis multipliers $\hat{h}$ and $G_j$ have converged, processor 310 executing magnetic field data combination module 334 performs step 610 to determine the weight vector h to be applied to the signal measurements $f_j$, so as to best approximate the single underlying signal estimate. Processor 310 does this by solving the over-determined equation system $G_j = h \cdot f_j$ with j=1 ... N for h, where h describes the best way to combine the observations ($g_a$, $g_b$, . . . ) to approximate G. According to some embodiments, processor 310 may solve for h using least squares.

In embodiments where $g_k$ and G are complex and where phase offsets exist between the observations f, processor 310 may then perform optional step 611 to standardise the phase of each component of the weight vector h, to in other words to adjust the phase of h to account for the phase differences, in line with step 601. At step 611, processor 310 executing magnetic field data combination module 334 applies the same multiplication as that performed at step 601 to each element of h. This results in a h which is a complex-valued vector. However, the phase of each of its elements is not estimated, but is predetermined by the known phase offsets.

At step 612, processor 310 executing magnetic field data combination module 334 then makes the weight vector h available for future processing. The making available may include sending the values of vector h to an external device such as an inline sensor 110 or magnetic field sensor 180, or by storing the values of vector h to a memory location such as memory 330 for future access.

Vector h can later be used to estimate a single magnetic signal value G from a given tuple of magnetic field measurements f using the equation:

$$G(t)=h \cdot f(t)$$

As described above with reference to methods 400 and 500, this step may be applied at steps 405 and 456, for example.

Where multi-dimensional measurements are used, the single-measurement equation for calculating current:

$$I=p*G$$

as described above with reference to FIG. 5 can be changed to take a multi-dimensional measurement vector f, as described above with reference to step 408 of FIG. 4A:

$$I=p*(h \cdot f)=(p*h) \cdot f$$

In this modified equation, there is still a single proportionality factor (p*h) which gets applied to the magnetic field measurements to relate them to the current through the cable. However, this factor is a vector rather than a single value.

Figure 7A:
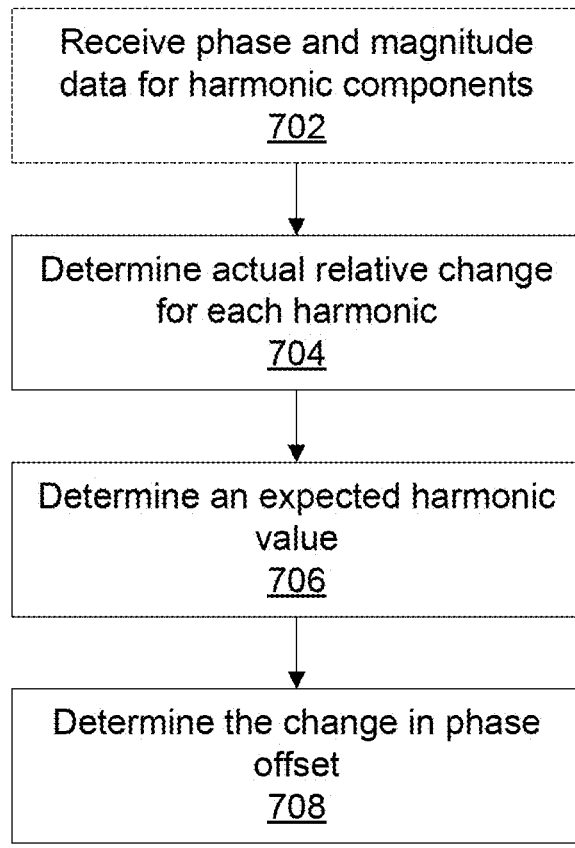
FIG. 7A shows a flowchart of a method for calculating a time-dependent phase offset according to some embodiments.
Figure 7B:
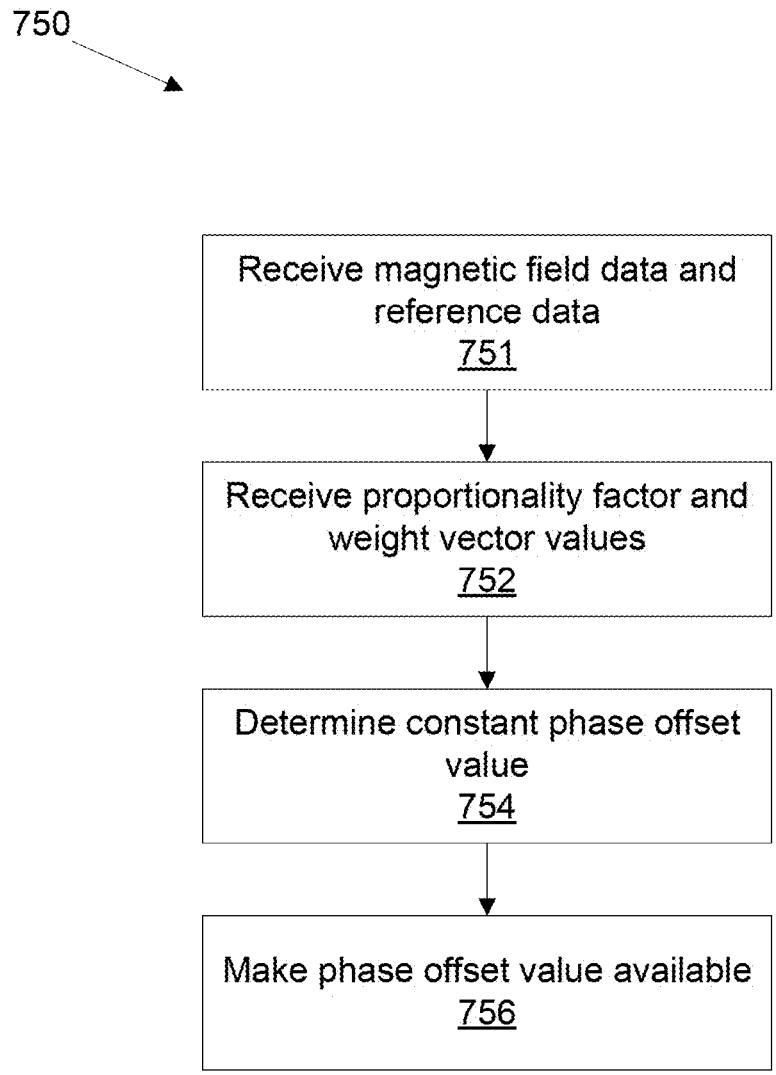
FIG. 7B shows a flowchart of a method for calculating a time-independent phase offset according to some embodiments.

FIGS. 7A and 7B relate to determining phase offsets to compensate for the time-independent and time-dependent phase differences between the measurements taken by sensors 110 and sensor 180.

In the methods described above, any complex-valued measurements G and $A_i$, being measurements containing phase information, have been assumed to contain accurate phase information relative to the voltage phase. This can easily be achieved for the $A_i$ measurements, because the inline sensors 110 have direct access to voltage-carrying conductors, and can therefore directly measure the phase information.

However, as magnetic field sensor 180 has no direct contact to the voltage-carrying conductors of cable 121, it is more difficult to accurately obtain the voltage phase, and thus to accurately measure the phase of the magnetic field relative to the voltage phase within cable 121.

According to some embodiments, the inline sensors 110 may broadcast the voltage phase information they measure, and sensor 180 may measure the phase of the magnetic field of cable 121 relative to the phase information received from sensors 110 in such broadcasts. However, this requires at least one of inline sensors 110 to be within radio range of sensor 180, and also requires sensor 180 to frequently activate a radio receiver to listen for the broadcasts. As sensor 180 may be battery powered, it may be desirable to minimise the power usage of sensor 180.

According to some alternative embodiments, sensor 180 may be configured to measure the electric field which emanates from cable 121. The electric field is necessarily either in phase with the voltage, or at a 180 degree phase offset to the voltage supplied by cable 121, and so allows for the phase offset to be determined. Measuring the electric field requires sensor 180 to comprise a receiving plate 1060, so that capacitive coupling can occur between the conductors of cable 121 and receiving plate 1060, and an impedance converter, analog-to-digital converter, or comparator acting as an electric field sensing element 1070 to observe the received electric field signal.

The capacitance between the conductors of cable 121 and receiving plate 1060 is likely to be extremely small and dependent on the internal geometry of the cable 121 as well as the dielectric properties of the cable's insulation, the casing of sensor 180, and all other materials present between the conductors of cable 121 and receiving plate 1060. There is also a large but inherently non-infinite input impedance for electric field sensing element 1070. The combination of the very small capacitance and the very large input impedance forms a CR high pass filter. Given an appropriate choice of electric field sensing element 1070 and thus a sufficiently high input impedance, the electric field sensing element will have sufficient amplitude post this implicit filter to make it possible for the electric field sensing element 1070 to synchronise to the signal. It will therefore be possible to measure the magnetic field's phase relative to the measured electric field signal.

However, depending on the particular values for the capacitance and input impedance, the implicit CR high pass filter may introduce a phase shift. Thus, the measurements of the magnetic field's phase made by sensor 180 may be relative to a reference phase which is itself offset from the voltage's phase by an unknown angle ϕ.

Using method 600 as described above to combine complex measurements from multiple magnetometer axes into an estimate for a single underlying signal does not require that the absolute phase of those measurements is accurate relative to the voltage's phase. Similarly, performing method 500 to determine a proportionality factor p from complex-valued measurements G and $A_i$ requires magnitude only. As long as the phase offset ϕ is constant or time-independent, the methods 500 and 600 as described above with reference to FIGS. 5 and 6 can be applied without modification. The phase offset ϕ will simply carry through to the resulting estimate for current as determined at step 408 of method 400, so that an intermediate estimate Î is determined as:

$$\hat{I}=(p*h) \cdot f$$

In order to obtain an accurate estimate for I, this intermediate estimate Î must be phase shifted by ϕ. This can be achieved by multiplying it with rot(ϕ)=cos ϕ+isin ϕ. So $$I=(rot(\phi)*p*h) \cdot f$$

FIG. 7B relates to determining a time-independent phase offset ϕ to apply to the equation above, to compensate for the time-independent phase difference between the measurements taken by sensors 110 and sensor 180. FIG. 7B depicts a method 750 that may be performed by processor 310 at step 407 of method 400, as described above with reference to FIG. 4A.

At step 751 of method 750, processor 310 receives magnetic field data and reference data from sensors 110 and sensor 180. According to some embodiments, processor 310 may receive an intermediate estimation of current as previously determined by processor 310, instead of the magnetic field data.

At step 752 of method 750, processor 310 receives values p and h based on which the phase offset $\phi$ is to be determined.

At step 754, for the given p and h values, processor 310 determines a value of $\phi$ so as to minimise a measure E of the total difference between the changes observed by the inline sensors 110, and the changes predicted by the above formula for calculating I, across all appropriate time pairs $s_j \in T$, as determined at step 504 of method 500:

$$E_j = (rot(\phi) * p * h) \cdot \Delta_j f - \sum_{i=1}^{N} \Delta_j A_i$$

According to some embodiments, processor 310 may use the sum of the squared differences as the measure E:

$$E = \sum_j E_j^2$$

According to some embodiments, processor 310 may use a weighted sum of absolute differences as the measure E, which may be more robust, and provide overall better results in some embodiments:

$$E = \sum_j v_j |E_j|$$

In either case, processor 310 should be able to determine a value for $\phi$ with appropriate precision by performing an exhaustive search.

Once a value for $\phi$ is determined, at step 456 processor 310 makes the value of $\phi$ available for further processing, by storing the value to memory 330 or by sending it to another device for processing. As described above with reference to step 408 of method 400 and step 456 of method 450, an accurate estimate for the current I can subsequently be determined using the p and h values calculated via methods 500 and 600 as:

$$I = (rot(\phi) * p * h) \cdot f$$

As described above, determining the phase of the electric field locally on sensor 180 relies on capacitive coupling between cable 121's internal conductors and receiving plate 1060. This capacitance, and thus ultimately the phase shift $\phi$, depends on the dielectric properties of the cable's insulation, the sensor's casing, and all other materials present between the conductors and receiving plate 1060, among other influences. The phase shift $\phi$ also depends on the input impedance of the signal processing component, being electric field sensing element 1070. Determining the phase shift $\phi$ as described above assumes that all of these influences on $\phi$ are dependent only on the particular installation scenario for sensor 180, but are constant over time, and that thus the phase offset $\phi$ is independent of time.

However, in some embodiments, the capacitance between receiving plate 1060 of sensor 180 and the conductors of cable 121 may change over time depending on influences such as temperature and humidity. This may be true where sensor 180 is installed at a significant distance from cable 121, such as on the outside of a conduit, for example. The input impedance of the signal processing component may also exhibit temperature dependent behaviour. As a consequence, the actual phase offset $\Phi(t)$ of the magnetic field produced by cable 121 may be a combination of the constant component $\phi$ as determined above and a component $\alpha(t)$ that varies over time.

In most cases, $\alpha(t)$ will vary slowly. For example, $\alpha(t)$ may vary by only a few degrees per hour. However, over time $\alpha(t)$ may grow quite large, and only using $\phi$ as described above may result in estimates for I that exhibit significant phase errors.

According to some embodiments, this issue may be overcome by measuring the time-dependent phase difference $\Phi(t)$. Where sensor 180 has access to a precise source of time, with accuracy around 100 μs or better, sensor 180 may be configured to periodically timestamp a zero-crossing of the observed electric field measured by electric field sensing element 1070. Processor 310 may be configured to compare these timestamps to a centralised record of actual voltage zero crossing timestamps in the corresponding electricity grid 120, which may be stored in memory 330, to determine the phase offset $\Phi(t)$ for each time t for which the sensor 180 provided a timestamp. As $\Phi(t)$ changes only slowly, processor 310 may be configured to perform a simple interpolation of $\Phi(t)$ for times t between sensor 180's timestamped observations.

Unfortunately, keeping time with the required accuracy requires sensor device 180 to include additional components, such as temperature compensated oscillators (TXCOs) and/or GPS pulse-per-second signal receivers, which tend to both be expensive and consume problematic amounts of power. According to some alternative embodiments, sensor 180 does not include any time-keeping components of the required degree of accuracy, but instead includes a communication module 1030 that allows for local communication between sensor 180 and inline sensors 110. For example, sensors 110 and 180 may be configured to communicate via local radio communication.

In this alternative embodiment, sensor 180 may be configured to send a radio signal at a point in time which has a well-defined offset from the time of a zero-crossing of the observed electric field. When inline sensor 110 receives this signal, it can determine the actual time since the corresponding voltage zero crossing, and can thus determine and report $\Phi(t)$ for the given time t.

Where sensor 180 and inline power sensor 110 are equipped with low power radio transceivers, and are within radio range of each other, this may be a low-cost and low-power method for obtaining a measure of $\Phi(t)$. However, as the phase offset information for sensor 180 is calculated by inline sensor 110, this information is not available at sensor 180 unless additional power is used to transmit it back. Furthermore, this method requires sensors 110 and 180 to be within low power radio range of each other, and any outage of power to sensor 110 may result in complete loss of information about $\Phi(t)$ for sensor 180.

According to some embodiments, sensors 110 and 180 may not be equipped with low power radio, or may not be located within low power radio range of each other. Furthermore, high-precision time keeping may not be available on sensor 180. In this case, processor 310 may be configured to estimate the change in the phase offset $\alpha(t)$ between two points in time, $t_1$ and $t_2$ by combining observations from sensor 180 and inline sensors 110.

FIG. 7A describes a method for estimating the change in the time-dependent phase offset α(t) between two points in time, $t_1$ and $t_2$ by combining observations from sensor 180 and inline sensors 110.

FIG. 7A depicts a method 700 which may be executed by processor 310 when executing optional step 407 of method 400. According to some embodiments, processor 310 may be caused to execute phase offset estimation module 335 to perform method 700 to estimate the change in the phase offset α(t) between two points in time, $t_1$ and $t_2$ based on measurements of harmonics present in the voltage supplied by the grid 120 via cable 121.

While the voltage waveform of the voltage supplied by grid 120 may often be a nominal 50 Hz or 60 Hz sine wave depending on location, the large amount of non-linear loads such as variable speed drive motors as well as switch mode power supplies mean that additional "harmonic" components at 3, 5, 7, 9 and 11 times the nominal frequency (and beyond) are always present on the grid supply and can be measured on the voltage waveform of the voltage supplied by grid 120. The magnitudes and phases of these harmonics do change over time as a result of harmonic-producing loads and generators being connected to, and disconnected from, the grid.

According to some embodiments, method 700 may be executed based on measurements of harmonics as measured by sensor 180. According to some embodiments, method 700 may be executed based on measurements of harmonics as measured by both sensor 110 and sensor 180.

Optional step 702 may be performed where method 700 is being executed based on measurements of harmonics as measured by both sensor 110 and sensor 180. At optional step 702 of method 700, in order to estimate the change in phase offset α(t) between two points in time, $t_1$ and $t_2$, processor 310 executing phase offset estimation module 335 may receive independently measured phase and magnitude values from sensor 180. These values may correspond to a number of harmonic components sensor 180 observes in the observed electric field of cable 121 relative to the observed base frequency's phase. Sensor 180 may be configured to report complex-valued measurements $E_m$ for each m-th harmonic of the nominal frequency.

Processor 310 may also receive the phase and magnitude of a number of harmonic components as measured by each inline sensor 110 on its voltage supply as supplied to monitored appliances 161. Sensors 110 may generate and send these as the complex-valued measurements $H_m$ for each m-th harmonic of the nominal frequency.

Where harmonics from both sensors 110 and 180 are received, at step 704 processor 310 may be configured to determine the actual relative change in phase and amplitude from the reference data received from sensors 110 from the previous measurement to the current measurement.

As the phase of each of the harmonics is also subject to a phase shift caused by the implicit CR high pass filter created by sensor 180, processor 310 may not be able to directly match measurements $E_m$ as supplied by sensors 110 with measurements $H_m$ as supplied by sensor 180. Instead, at step 704, given the $E_m$ for two points in time, $t_1$ and $t_2$, processor 310 executing phase offset estimation module 335 may determine a relative actual change $C_m$ in phase and magnitude for the m-th harmonic to be:

$$C_m = E_m(t_2)/E_m(t_1)$$

Where harmonics data from only sensor 180 is received, at step 704 processor 310 may instead assume $C_m$ to be 1. This is done as examination of the harmonics data obtained in the field shows that non-linear loads or harmonic-producing generators connecting to, or disconnecting from, the grid 120 tend to cause changes in measurements $H_m$ at cable 121 only for a small number of harmonics m, while leaving the majority of harmonic measurements $H_m$ unchanged.

At step 706, processor 310 may be configured to apply the relative change as determined at step 704 to the previous data received from sensor 180, to determine an expected value for the current data.

In the absence of a change in the phase offset α(t) between $t_1$ and $t_2$, the same relative change $C_m$ is expected to be observed in the measurements $H_m$ provided by sensor 180. At step 706, processor 310 executing phase offset estimation module 335 may therefore determine an expected harmonic value $\hat{H}_m$ to be measured by sensor 180 at time $t_2$ as:

$$\hat{H}_m(t_2) = C_m * H_m(t_1)$$

However, in some cases there may be a change Δα=α($t_2$)−α($t_1$) in the time-dependent components of the base frequency's phase offset. This phase change corresponds to a changed time offset between the actual voltage zero crossing, and the electric field's zero crossing observed by sensor 180 in cable 121. As all $H_m$ are measured relative to the observed base frequency's phase, that same time offset affects the measurement of all $H_m$ observed by sensor 180. However, because the period of the m-th harmonic is only 1/m-th the period of the base frequency, the time offset that causes a phase change of Δα at the base frequency will cause a phase change of m*Δα at the m-th harmonic.

Processor 310 still executing step 706 can therefore use rot(γ)=cos γ+isin γ for a given Δα to determine a predicted value $\hat{H}_m(t_2)$ for the harmonics at time $t_2$ at sensor 180 to be:

$$\hat{H}_m(t_2) = C_m * H_m(t_1) * \text{rot}(m * \Delta\alpha)$$

At step 708, processor 310 proceeds to find an estimate for the phase offset change Δα at the base frequency such that applying corresponding phase changes to the expected value as calculated at step 706 at the various harmonic frequencies minimises the difference between the observed current measurement measured by sensor 180 and the changed expected value of that measurement.

Where harmonics for both sensors 110 and 180 were received, given the measured values for $E_m$ and $H_m$ at times $t_1$ and $t_2$, the actual change Δα in the time-dependent component of the phase offset Φ(t) between those times can be estimated by processor 310 as the value for Δα which minimizes the total difference between the predicted $\hat{H}_m(t_2)$ and the corresponding observed values $H_m(t_2)$. At step 708, processor 310 executing phase offset estimation module 335 may therefore be configured to choose a value for Δα to minimise the difference D:

$$D = \sum_m |H_m(t_2) - C_m * H_m(t_1) * rot(m * \Delta\alpha)|$$

across all observed harmonics m.

For cases where harmonic data is received only from sensor 180, as the actual phase and/or magnitude of a small number of harmonics $H_m$ will change at some points in time, minimising the difference D across all harmonics used as described above as a criterion for choosing the estimate of Δα may not be suitable, as it may not be robust enough against the outliers caused by these changes in harmonics present on the grid 120. Instead, processor 1050 or processor 310 may determine Δα at step 708 by minimising the D according to the modified equation:

$$D=\text{median}(|H_m(t_2)-H_m(t_1)*\text{rot}(m*\Delta\alpha)|)$$

calculated across all used harmonics m.

According to some embodiments, all observable harmonics m∈(3,5,7,9,11, . . . ) may be used to determine Δα and therefore Φ(t). However, harmonics for which m is divisible by three, or triplen harmonics, are routinely filtered in the connection between the grid 120 and the household or premise connected via electricity meter 130. For this reason, triplen harmonics observed by sensors 110 and 180 are likely to originate from within the household rather than from grid 120, and so may be observed differently at the different locations of sensors 110 and 180. For this reason, according to some embodiments triplen harmonics may be excluded from the calculation of Δα and Φ(t), so that m∈(5,7,11,13, . . . ) where harmonic data is received from both sensor 180 and sensor 110. As higher harmonics are harder to accurately measure and typically have lower magnitudes, according to some embodiments, only harmonics m∈(5,7) or m∈(5,7,11) may be used in such cases.

Processor 310 may estimate the base frequency phase change between any two points in time $t_1$ and $t_2$, and therefore determine a complete estimate for α(t) and Φ(t), by tracking from sample time to sample time, by calculating the change for each sample time relative to a common anchor sample time, or by a combination of these methods.

Using method 700 for determining α(t) and Φ(t) based on measurements received from both sensors 110 and 180 still shares a number of drawbacks with previously described methods which rely on precise timing of local radio signals. For example, the phase offset information for sensor 180 is calculated by processor 310 of central computing unit 170, after-the-fact, and thus is not available at sensor 180. Thus, sensor 180 cannot itself accurately calculate the current through cable 121 if such calculation relies on the estimate of α(t). Furthermore, an outage of power to all inline sensors 110 will result in a complete loss of information about α(t) for sensor 180. Given that there may be only a single inline sensor 110 in a given household, and given that people frequently and wantonly unplug devices without being aware of the consequences, requiring data from both devices 110 and 180 to make sense of the sensor 180's measurements can be unreliable.

For these reasons, according to some embodiments, α(t) may instead be estimated using only data measured by sensor 180, as described above specifically with reference to steps 702, 704 and 708. According to some embodiments, in this case method 700 may be performed by processor 1050 of sensor 180 executing program code 1045, and only the output may be reported to processor 310 for use in step 407 of method 400. According to some alternative embodiments, the estimation may be performed by processor 310.

In order to achieve maximum robustness, it is desirable to use as many harmonics $H_m$ as possible. As this variant of method 700 does not combine harmonics information measured at two separate locations in the household, there is no reason to exclude the triplen harmonics. Furthermore, as these calculations can be performed locally on sensor 180, using additional harmonics does not result in additional power requirements for communicating the $H_m$ to computing unit 170. Instead, sensor 180 may simply communicate the resulting estimate for α(t) to computing unit 170. For these reasons, some embodiments of method 700 may be performed using harmonics m∈(3,5,7,9,11) or m∈(3,5,7,9,11,13).

If processor 310 has estimated just the time-dependent component α(t) of Φ(t) using one of the harmonics-based methods outlined above, processor 310 estimates the constant component ϕ to obtain Φ(t) by minimising an error measure E over all appropriate time pairs j using the formula:

$$E_j = (rot(\phi + \alpha(t_j)) * p * h) * \Delta_j f - \sum_{i=1}^{N} \Delta_j A_i$$

Once α(t), ϕ and therefore Φ(t) have been determined, to compensate for time-dependent phase variations the formula for determining current as calculated at step 408 of method 400 and/or at step 456 of method 450 is modified to become:

$$I(t)=(\text{rot}(\phi+\alpha(t))*p*h)\cdot f(t)=(\text{rot}(\Phi(t))*p*h)\cdot f(t)$$

The calculated current I(t) can then be used to determine the power P(t) supplied by cable 121, as described above with reference to step 460 of method 450. This concludes the description of the method for calculating power as performed by system 100 of FIG. 1.

A description of the method for calculating power as performed by system 200 of FIG. 2 will now be detailed.

As described above with reference to FIG. 2, in some alternative embodiments a second sensor 230 may be used to monitor the magnetic field caused by AC current flowing through cable 222, which conveys power from an inverter 220 connected to a rooftop PV system 210.

For system 200 shown in FIG. 2, the power $P_S$ conveyed through cable 222 can be calculated in the same way as described above with reference to step 460 of method 450:

$$P_S(t)=(\hat{V}_S*p_S*h_S*\text{rot}(\phi_S))\cdot(f_S(t)*\text{rot}(\alpha_S(t)))$$

Most of the parameters can be calculated for sensor 230 in the same way as previously described for sensor 180, as described above with reference to FIGS. 4A to 7B. $\hat{V}_S$, the representative voltage used for power calculation, may be the same as the fixed representative voltage $\hat{V}$ calculated by processor 310 at step 410 of method 400, or may be calculated in an analogous fashion by weighing the V(t) with $I_S(t)$ instead. Vector $h_S$, used to transform the tuple of magnetic measurements $f_S$ into a single signal, can be calculated by processor 310 as described above with reference to step 405 and method 600. Time-dependent phase offset $\alpha_S$ can be calculated by processor 310 using any of the time or harmonics based approaches described above with respect to step 407 and method 700.

Two parameters which cannot be calculated in the same way are proportionality factor $p_S$ and, if not provided by the method used to measure or estimate the time-dependent phase offset, $\phi_S$. For sensor 180, both of these are derived from the reference data provided by the inline sensors 110, which are not correlated in any way to the power through the PV system cable 221.

Instead, $\phi_S$ can be determined, if necessary, based on the assumption that changes in power delivered by PV system 210 during the daytime are purely active. In other words, rather than performing method 700, at step 407 processor 310 can calculate $\phi_S$ to minimise the total reactive change $C_R$:

$$C_R=\Sigma_{i \in daytime}|\Im(\Delta_j f_S(t)*\text{rot}(\phi_S+\alpha_S(t)))|$$

Figure 8:
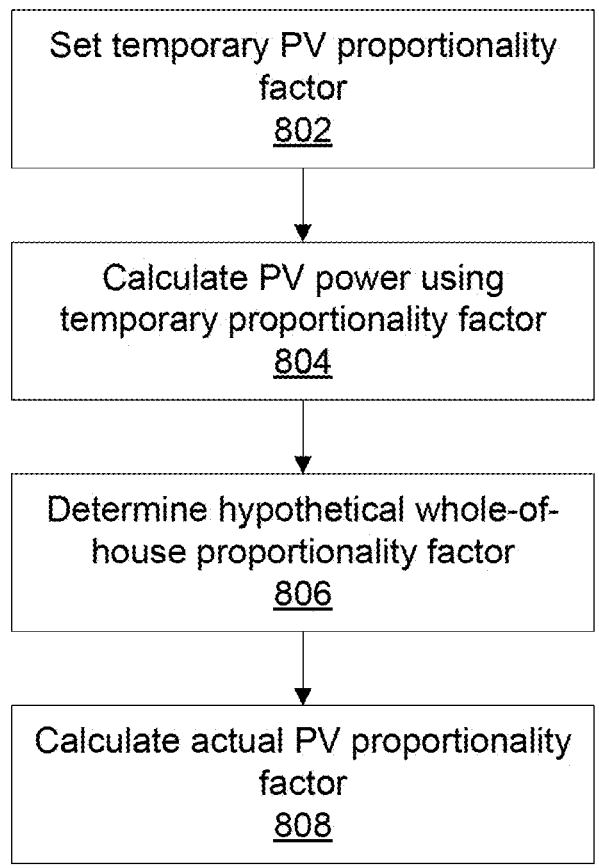
FIG. 8 shows a flowchart of a method for calculating a proportionality factor for the system of FIG. 2 according to some embodiments.

FIG. 8 described a method for determining an alternative proportionality factor $p_S$ for magnetic sensor 230, which may be referred to as the negative load proportionality factor, solar proportionality factor or PV proportionality factor. Proportionality factor $p_S$ can be calculated by processor 310 performing an alternative method 800 at step 414, rather than method 500. Processor 310 may be configured to perform method 800 when executing PV system module 337.

Method 800 starts at step 802, at which processor 310 executing PV system module 337 temporarily sets the PV proportionality factor $p_S$ to 1.

At step 804, processor 310 executing PV system module 337 calculates the PV power $P_S(t)$ based on the current temporary proportionality factor $p_S$, following steps 408 to 412 of method 400. At this stage, the calculated PV power is likely to be incorrect, as the current temporary proportionality factor $p_S$ is unlikely to be the actual PV proportionality factor.

At step 806, processor 310 executing PV system module 337 uses the calculated power $P_S(t)$ in place of $\Sigma_i A_i(t)$ in calculating a hypothetical whole-of-premises proportionality factor q by executing method 500 with $P_S(t)$ as calculated at 804 as reference data. This whole-of-premises proportionality factor q describes the relative magnetic signal strength of the sensor 180 to that of the PV system sensor 230, so that:

$$q = \frac{P_S(t)}{G}$$

Again, at this stage, the calculated whole-of-premises proportionality factor q is unlikely to be accurate, as it has been calculated based on a likely incorrect temporary proportionality factor $p_S$.

At step 808, processor 310 executing PV system module 337 determines the ratio of hypothetical whole-of-premises proportionality factor q and actual proportionality factor p as previously determined using inline sensor data from sensors 110, and calculates the PV proportionality factor for sensor 230 as $p_S = p/q$.

This proportionality factor $p_S$ can then be used in the equations described above with reference to FIGS. 4A and 4B, to allow the power P(t) supplied by cable 121 to be determined.

One further aspect of the system depicted in FIG. 2 will now be addressed.

The estimation of proportionality factor p as described above with reference to FIGS. 4 and 5 is predicated on current to unmonitored loads 612 rarely changing. In system 200 as depicted in FIG. 2, this may not be true for the negative load from PV inverter 220. The method described above with reference to FIG. 4A still works as long as the current to monitored loads 161 is not correlated to the output of PV system 210. However, more accurate results can be obtained by removing the influence of the rooftop PV system from the magnetic field measurement G.

Where a PV inverter 220 exists, at step 408 of method 400 processor 310 may therefore determine an estimated magnetic field measurement $\hat{G}$, being an estimate of what the magnetic field measurement at sensor 180 would be if not for the PV system 210. This estimate $\hat{G}$ may then be used in place of G for all further calculations.

Given the magnetic field measurement $G_S$ from sensor 230, processor 310 may find a suitable r such that:

$\Delta G = r * \Delta G_S$ using a robust method. Processor 310 may then calculate an estimate $\hat{G}$ for what the magnetic field measurement at sensor 180 would be if not for the PV system $\hat{G} = G - r * G_S$ Estimate $\hat{G}$ may then be used in place of G for all further calculations in method 400.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for allowing power supplied through a cable to be determined, the method comprising:
   receiving magnetic field data, the magnetic field data relating to a magnetic field generated by the cable,
   receiving reference data, the reference data relating to a current supplied to one or more monitored loads powered through the cable;
   based on the received magnetic field data and reference data, determining at least one parameter of a function that relates the magnetic field generated by the cable to the power supplied through the cable; and
   making available the at least one parameter, so that a power supplied by the cable can be determined based on the at least one parameter and a magnetic field value;
   wherein the one or more monitored loads are a subset of all the loads powered through the cable; and
   wherein the at least one parameter is a proportionality factor, and wherein the proportionality factor is determined by:
   determining a plurality of time periods over which the received reference data changes;
   selecting magnetic field data that corresponds to the determined time periods; and
   determining a proportionality factor by minimising an error measure across all determined time periods.

2. The method of claim 1, wherein minimising an error measure across all determined time periods comprises:
   determining an ideal proportionality factor value that relates the changes in received reference data to the changes in selected magnetic field data for each determined time period;
   determining a weight for each determined ideal proportionality factor value;
   choosing an overall proportionality factor, the overall proportionality factor being a value such that approximately half of the determined weights relate to ideal proportionality factors lower than the overall proportionality factor, and approximately half of the determined weights relate to ideal proportionality factors higher than the overall proportionality factor.

3. The method of claim 1, wherein the received reference data corresponds to the same time as the received magnetic field data, or further comprising interpolating the received reference data to match a time corresponding to the received magnetic field data.

4. The method of claim 1, wherein the received magnetic field data comprises a plurality of measurements for each time period.

5. The method of claim 4, further comprising combining the plurality of measurements into a single magnetic field value by:
   initialising a vector of magnetic field measurements to arbitrary values;
   determining an influence vector based on the initialised vector and the received magnetic field data;
   determining an approximate single magnetic field value based on a product of the influence vector and the received magnetic field data;

upon determining that the approximate single magnetic field value and the influence vector have not converged, repeat the determining an influence vector and determining an approximate single magnetic field value steps;

upon determining that the approximate single magnetic field value and the influence vector have converged, determining a weight vector based on the influence vector; and determining the single magnetic field value based on the weight vector and the received magnetic field values.

6. The method of claim 1, wherein the received magnetic field data and/or the received reference data comprise complex signals representing magnitude and phase and wherein the received magnetic field strength data and the received reference data have an arbitrary phase offset, the method further comprising determining the arbitrary phase offset.

7. The method of claim 1, wherein the phase offset changes over time, and wherein determining the phase offset comprises one of: comparing the timing of at least two zero crossings observed in the electric field near the cable to the independently known timing of the corresponding zero crossings of the voltage present in the cable, or measuring electric field harmonic data generated by the cable, measuring the corresponding voltage harmonic data, and detecting matching changes in the harmonic data, or measuring electric field harmonic data generated by the cable, and determining the phase offset based on an observation that actual voltage harmonics are reasonably close to constant.

8. The method of claim 1, wherein at least one of the first cable and the second cable comprises two or more conductors.

9. A method of determining power supplied through a cable, the method comprising:
receiving magnetic field data, the magnetic field data relating to a magnetic field generated by the cable;
receiving at least one parameter of a function that relates the magnetic field generated by the cable to a power supplied though the cable; and
based on the at least one parameter and the magnetic field data, determining a power supplied by the cable;
wherein the parameter of a function that relates the magnetic field generated by the cable to a power supplied though the cable is determined by performing the method of claim 1.

10. A method for determining power supplied through two cables, the method comprising:
receiving first magnetic field data, the magnetic field data relating to a magnetic field generated by a first cable,
receiving second magnetic field data, the magnetic field data relating to a magnetic field generated by a second cable,
receiving at least one parameter of a first function that relates the magnetic field generated by the first cable to the power supplied though the first cable;
receiving at least one parameter of a second function that relates the magnetic field generated by the second cable to the power supplied though the second cable;
based on the at least one parameter of the first function and a magnetic field value related to a magnetic field generated by the first cable, determining a power supplied by the first cable; and
based on the at least one parameter of the second function and a magnetic field value related to a magnetic field generated by the second cable, determining a power supplied by the second cable;

wherein the parameter of a function that relates the magnetic field generated by the cable to a power supplied though the cable is determined by performing the method of claim 1.

11. A method for allowing power supplied through two cables to be determined, the method comprising:
receiving first magnetic field data, the magnetic field data relating to a magnetic field generated by a first cable,
receiving second magnetic field data, the magnetic field data relating to a magnetic field generated by a second cable,
receiving reference data, the reference data relating to a current supplied to one or more monitored loads powered through the first cable;
based on the received first magnetic field data and reference data, determining at least one parameter of a first function that relates the magnetic field generated by the first cable to the power supplied though the first cable;
based on the received first and second magnetic field data and the received reference data, determining at least one parameter of a second function that relates the magnetic field generated by the second cable to the power supplied though the second cable;
making available the at least one parameter of the first function, so that a power supplied by the first cable can be determined based on the at least one parameter and a magnetic field value; and
making available the at least one parameter of the second function, so that a power supplied by the second cable can be determined based on the at least one parameter and a magnetic field value;
wherein the one or more monitored loads are a subset of all the loads powered through the first cable, and wherein the second cable is connected to a negative load that offsets the load through the first cable; and
wherein the at least one parameter of the first function is a proportionality factor, and wherein the proportionality factor is determined by:
determining a plurality of time periods over which the received reference data changes;
selecting magnetic field data that corresponds to the determined time periods; and
determining a proportionality factor by minimising an error measure across all determined time periods.

12. The method of claim 11, wherein the second magnetic field data is used to adjust the received first magnetic field data to compensate for the effects of the current through the second cable on the magnetic field caused by the current through the first cable.

13. The method of claim 11, wherein the at least one parameter of the second function is a negative load proportionality factor, or wherein the at least one parameter of the first function is a whole-of-premises proportionality factor.

14. The method of claim 13, wherein the negative load proportionality factor is determined by:
calculating the at least one parameter of the first function;
calculating the power through the first cable;
determining the negative load proportionality factor to be a value such that, according to some error measure, the difference between the calculated changes in power through the second cable determined using the negative load proportionality factor, and the calculated changes in power through the first cable, is minimised.

15. The method of claim 11, wherein the received reference data corresponds to the same time period as the received first magnetic field data and the received second magnetic field data, or further comprising interpolating the received reference data to match a time period corresponding to the first received magnetic field data and/or the second received magnetic field data.

16. The method of claim 11, where the negative load is a photovoltaic (PV) system.

17. A device for determining power supplied through a cable, the device comprising:
- a processor; and
- a memory storing program code;
- wherein the processor is configured to access and execute the program code, and wherein executing the program code causes the processor to perform the method for allowing power supplied through a cable to be determined, the method comprising:
  - receiving magnetic field data, the magnetic field data relating to a magnetic field generated by the cable;
  - receiving reference data, the reference data relating to a current supplied to one or more monitored loads powered through the cable;
  - based on the received magnetic field data and reference data, determining at least one parameter of a function that relates the magnetic field generated by the cable to the power supplied through the cable; and
  - making available the at least one parameter, so that a power supplied by the cable can be determined based on the at least one parameter and a magnetic field value;
- wherein the one or more monitored loads are a subset of all the loads powered through the cable; and
- wherein the at least one parameter is a proportionality factor, and wherein the proportionality factor is determined by:
  - determining a plurality of time periods over which the received reference data changes;
  - selecting magnetic field data that corresponds to the determined time periods; and
  - determining a proportionality factor by minimising an error measure across all determined time periods.

18. A system comprising the device of claim 17, a sensor device configured to measure and send the magnetic field data, and a sensor device configured to measure and send the reference data.

* * * * *